(12) United States Patent
Kizaki et al.

(10) Patent No.: US 7,161,693 B2
(45) Date of Patent: Jan. 9, 2007

(54) PRINTING CONTROL APPARATUS AND PRINTING CONTROL METHOD

(75) Inventors: Junichiro Kizaki, Kanagawa (JP); Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 772 days.

(21) Appl. No.: 10/242,626

(22) Filed: Sep. 13, 2002

(65) Prior Publication Data

US 2003/0053107 A1 Mar. 20, 2003

(30) Foreign Application Priority Data

| Sep. 14, 2001 | (JP) | ............................. 2001-280610 |
| Aug. 22, 2002 | (JP) | ............................. 2002-242035 |

(51) Int. Cl.
*B41B 1/00* (2006.01)
*G06F 15/00* (2006.01)

(52) U.S. Cl. ..................... 358/1.13; 358/1.15; 709/220

(58) Field of Classification Search ............... 358/1.15, 358/1.13, 1.12; 709/220, 217
See application file for complete search history.

(56) References Cited

U.S. PATENT DOCUMENTS

| 6,094,679 A * | 7/2000 | Teng et al. .................. 709/220 |
| 6,847,466 B1 * | 1/2005 | Gazdik et al. .............. 358/1.15 |
| 2002/0113989 A1 * | 8/2002 | Ferlitsch et al. ........... 358/1.15 |

FOREIGN PATENT DOCUMENTS

| JP | 6-187111 | 7/1994 |
| JP | 8-278865 | 10/1996 |
| JP | 9-006557 | 1/1997 |
| JP | 10-198540 | 7/1998 |
| JP | 11-134134 | 5/1999 |
| JP | 11-345100 | 12/1999 |
| JP | 2000-010753 | 1/2000 |
| JP | 2000-181658 | 6/2000 |
| JP | 2001-043051 | 2/2001 |

OTHER PUBLICATIONS http://www.frogmorecs.com/arts/using$_{13}$ the_generic_driver.html.*
Crawford, Sharon, Windows 2000 Pro, the Missing Manual, Nov. 2000, O'Reilly Press, First editions pp. 350-354.*

* cited by examiner

*Primary Examiner*—Kimberly Williams
*Assistant Examiner*—Scott A. Schlack
(74) *Attorney, Agent, or Firm*—Fitzpatrick, Cella, Harper & Scinto

(57) ABSTRACT

Even when printing cannot be executed by only the common setting included in a printing designation document, in order to generate the printing setting information native in a printer in accordance with the common general designation information included in a printing designation document and to execute the processing of a printing document in accordance with the information, a printing control method inputs a printing document and a printing designation document for specifying the processing content of the printing document, specifies a printer for processing the printing document in accordance with the input printing designation document, and obtains the native printing setting information which can be set to a control program in the printing control apparatus for controlling the specified printer, and controls the processing of transmitting a printing designation according to native printing setting information obtained by the obtainment step to the printer through the printing control program.

12 Claims, 24 Drawing Sheets

| | |
|---|---|
| PRINTER DEVICE NAME | 501 |
| PRINTING DOCUMENT NAME | 502 |
| DESIGNATION-TO-PRINTER INFORMATION SECTION | 503 |
| DEVMODE | 504 |
| PAGE ARRANGEMENT INFORMATION SECTION | 505 |
| MEMBER-PRINTER-NAME STORAGE SECTION | 506 |
| MEMBER DEVMODE STORAGE SECTION | 507 |

| NO | ATTRIBUTE INFORMATION | | REMARKS |
|---|---|---|---|
| 1 | PRINTING METHOD | ONE-SIDE / BOTH-SIDE / BOOKBINDING PRINTING | |
| 2 | FORM SIZE | MANUSCRIPT SIZE / FIXED SIZE | • WHEN "A4 + A3", "B4 + B3", OR "LETTER + LEISURE (11 × 17)" IS SPECIFIED, SPECIFY Z-FOLDING<br>• WHEN BOOKBINDING PRINTING OR N-up PRINTING IS SPECIFIED, THE MANUSCRIPT SIZE OF FIRST PAGE IN FIRST CHAPTER IS AUTOMATICALLY SELECTED |
| 3 | FORM DIRECTION | LENGTH / WIDTH | • CAN BE SELECTED ONLY FOR FIXED SIZE |
| 4 | BINDING MARGIN / BINDING DIRECTION | | • SHIFT, ENLARGEMENT, OR CONTRACTION CAN BE SPECIFIED |
| 5 | N-up PRINTING | NUMBER OF PAGES, ARRANGEMENT SEQUENCE, BOUNDARY, AND ARRANGEMENT POSITION | • ARRANGEMENT POSITIONS INCLUDE NINE PATTERNS<br>• EQUIMULTIPLE PRINTING CAN BE SPECIFIED |
| 6 | ENLARGEMENT AND CONTRACTION | ON / OFF | WHEN FIXED-SIZE OR N-up PRINTING IS SELECTED FOR FORM SIZE, IT IS POSSIBLE TO AUTOMATICALLY SPECIFY ON AND OFF |
| 7 | WATERMARK | | • INDIVIDUAL DESIGNATION IS POSSIBLE EVERY LOGIC PAGE OR PHYSICAL PAGE<br>• ALL CHAPTERS OR ALL PAGES ARE PURPOSED |

FIG. 13B

| | | | |
|---|---|---|---|
| 8 | HEADER AND FOOTER | | • INDIVIDUAL DESIGNATION IS POSSIBLE EVERY LOGIC PAGE OR PHYSICAL PAGE<br>• ALL CHAPTERS OR ALL PAGES ARE PURPOSED |
| 9 | FORM DISCHARGE METHOD | STAPLE / PUNCHED HOLE | • STAPLE / PUNCH IS POSSIBLE ONLY FOR ONE-SIDE / BOTH-SIDE PRINTING<br>• STAPLE IS APPLIED TO ONE OR TWO PLACES |
| 10 | BOOKBINDING DETAILS | DESIGNATION OF OPENING DIRECTION / MIDDLE BINDING / ENLARGEMENT AND CONTRACTION OR DESIGNATION OF BINDING MARGIN OR SEPARATE VOLUME | • ONLY FOR BOOKBINDING PRINTING |
| 11 | FRONT COVER / BACK COVER | | • PRINTING DESIGNATION TO FRONT COVER 1/2 OR BACK COVER 1/2<br>• DESIGNATION OF FORM-FEED PORT (INCLUDING INSERTER) |
| 12 | INDEX PAPER | | • CHARACTER STRING CAN BE PRINTED ON INDEX PORTION AND ANNOTATION CAN BE SET ON INDEX PAPER<br>• BOOKBINDING PRINTING CANNOT BE SPECIFIED |
| 13 | PLYPAPER | | • DESIGNATION OF FORM-FEED PORT (INCLUDING INSERTER)<br>• MANUSCRIPT DATA CAN BE PRINTED ON INSERTED FORM<br>• BOOKBINDING PRINTING CANNOT BE SPECIFIED |
| 14 | CHAPTER PAUSE | "NONE" / "PAGE CHANGE" / "FORM CHANGE" | • WHEN INDEX PAPER OR PLYPAPER IS SPECIFIED, "FORM CHANGE" IS FIXED<br>• "FORM CHANGE" IS APPLIED TO ONE-SIDE PRINTING |

FIG. 14

| NO | ATTRIBUTE INFORMATION | | REMARKS |
|---|---|---|---|
| 1 | FORM SIZE | MANUSCRIPT SIZE / FIXED SIZE | · IN THE CASE OF FIXED SIZE, "FORM CHANGE" IS AUTOMATICALLY SPECIFIED<br>· WHEN A PLURALITY OF FORMS ARE SELECTED FOR BOOK, THE FORMS CAN BE CHANGED ONLY BY SPECIFIED FORMS. FORM SIZES CAN BE CHANGED EVEN IN THE CASE OF DESIGNATION FOR ADJUSTING TO BOOK |
| 2 | FORM DIRECTION | LENGTH / WIDTH | · CAN BE SELECTED ONLY FOR FIXED SIZE |
| 3 | N-up PRINTING DESIGNATION | NUMBER OF PAGES / ARRANGEMENT SEQUENCE / BOUNDARY / ARRANGEMENT POSITION | · ARRANGEMENT POSITIONS INCLUDE NINE PATTERNS<br>· EQUIMULTIPLE PRINTING CAN BE SPECIFIED |
| 4 | ENLARGEMENT / CONTRACTION | ON / OFF | · WHEN FIXED-SIZE OR N-up PRINTING IS SELECTED FOR FORM SIZE, ON AND OFF CAN BE AUTOMATICALLY SPECIFIED |
| 5 | WATERMARK | DISPLAY / NON-DISPLAY | · DESIGNATION OF WHETHER TO DISPLAY ALL WATERMARKS SPECIFIED BY BOOK |
| 6 | HEADER AND FOOTER | DISPLAY / NON-DISPLAY | · DESIGNATION OF WHETHER TO DISPLAY ALL HEADERS AND FOOTERS SPECIFIED BY BOOK |
| 7 | FORM DISCHARGE METHOD | STAPLE | · WHEN STAPLE IS SPECIFIED BY BOOK, OFF IS POSSIBLE. DEFAULT IS ON |

FIG. 15

| NO | ATTRIBUTE INFORMATION | | REMARKS |
|---|---|---|---|
| 1 | PAGE ROTATION DESIGNATION | | · ROTATIONS OF 0°/90°/180°, AND 270° CAN BE SPECIFIED |
| 2 | WATERMARK | DISPLAY/ NON-DISPLAY | · DESIGNATION OF WHETHER TO DISPLAY ALL WATERMARKS SPECIFIED BY BOOK |
| 3 | HEADER AND FOOTER | DISPLAY/ NON-DISPLAY | · DESIGNATION OF WHETHER TO DISPLAY ALL HEADERS AND FOOTERS SPECIFIED BY BOOK |
| 4 | ZOOM | 50% - 200% | · DESIGNATION OF RELATIVE MAGNIFICATION WHEN ASSUMING SIZE FITTED TO VIRTUAL LOGIC PAGE REGION AS 100% |
| 5 | ARRANGEMENT POSITION | | · DESIGNATION OF NINE FIXED PATTERNS AND OPTIONAL POSITION |
| 6 | ANNOTATION | | |
| 7 | VARIABLE ITEMS | | |
| 8 | PAGE DIVISION | | |

FIG. 22

```
typedef struct _devicemode {   /* dvmd */
    TCHAR   dmDeviceName [32] ;
    WORD    dmSpecVersion ;
    WORD    dmDriverVersion ;
    WORD    dmSize ;
    WORD    dmDriverExtra ;
    DWORD   dmFields ;
    short   dmOrientation ;
    short   dmPaperSize ;
    short   dmPaperLength ;
    short   dmPaperWidth ;
    short   dmCopies ;
} DEVMODE ;
```

PRINTING CONTROL APPARATUS AND PRINTING CONTROL METHOD

FIELD OF THE INVENTION

The present invention relates to a printing control apparatus and a printing control method used for a document processing system for integrating output data values generated by various programs including a document processing program and an image editing program into one document and providing a function for editing the document.

BACKGROUND OF THE INVENTION

When different types of data such as data for a character, data for a table, and data for an image are used, it is necessary to use different structures for defining these types of data and different editing operations for these types of data. Therefore, various application programs corresponding to types of data are prepared. A user uses an application for each type of data, that is, the user uses a character processing program in order to edit characters, a table computing program in order to edit tables, and an image editing program in order to edit images.

Thus, it is common that a user uses an application program for each type of data. However, as a document to be prepared by a user, a document constituted by a plurality of types of data such as characters and tables or characters and images is more common than a document constituted by one type of data such as only characters, tables or images. Therefore, to prepare a purposed document including a plurality of types of data, it has been necessary for a user to print data for each of various applications by using a printing function provided for the application and combine printed matters in a desired sequence.

Moreover, some of programs referred to as the so-called office suite for forming one integrated application by various types of applications provide a function for combining data values generated by various applications and constituting one document. By using the integrated application, a user can integrate data values generated by applications into one purposed document by a specific application included in an integrated application.

Moreover, a system (POD: Print On Demand) is spread in recent years which stores documents such as a manual, catalog, and meeting material in the form of electronic documents and prints only a necessary number of copies according to necessity. The POD system uploads a document file prepared by a user to a printing management server and the operator of the printing management server makes the server print the document file. In the case of this system, when an operator first designates printing of a document to be printed, the above content designation is converted into an electronic document on a printing management server as a printing designation document (generally referred to as a job ticket) and the job ticket information is entered in the printing management server instead of designating a printer to be used, a format to be used, and a function of the printer to be used for printing every time like the case of normal printing. Thereby, it is possible to obtain the same output format every time even if there is no printing document preparer.

Moreover, some of the systems are provided with a function for decentralizing processings to a plurality of printers previously entered in order to increase a printing speed. Furthermore, there are some systems having a function for executing substitute printing by a previously designated printer in order to secure printing even if a designated printer cannot be operated due to a trouble. When using the above function, a printing designation described in a printing designation document (job ticket) is similarly transmitted to a plurality of printers so that the same result can be obtained from any printer. Furthermore, to output different conditions (e.g. the number of copies) by a plurality of printers, it is necessary to enter each job ticket in a printing management server.

Thus, in the case of the conventional POD system, it is necessary to previously enter a job ticket in a printing management server. Moreover, to use a function of the POD system such as decentralization printing, it is necessary to use the printing management server of the POD system and therefore, a problem occurs that the cost increases.

Therefore, a printing system has been considered in recent years which has a decentralized printing function for directly generating printing jobs for a plurality of printers by a client PC. In the case of the printing system having the decentralized printing function, however, it is necessary to set each printer driver to be decentralized for printing whenever a client PC executes a printing designation and always require a printing document preparer.

Moreover, when a user prepares one purposed document by combining printed matters according to various applications, for example, in order to assign a page number to each page, it is necessary to once print out all necessary data, form the data into a document, and decide page numbers to be assigned. Then, a decided page number is written in each page of a manuscript (this is referred to as a logic page or manuscript page) prepared by each application. Even when an application program has a function for assigning page numbers, if there is a discontinuous portion, a user must designate a page number for the portion. Moreover, when rearranging pages of a purposed document, it is necessary to reassign page numbers in accordance with the rearranged pages. Furthermore, even when not changing contents of data but changing only formats such as a case of integrating a plurality of manuscript pages into one page as a printed matter (this is referred to as a physical page or printed page) or changing one-side printing to both-side printing, it is necessary to retry edition and printing depending on an application.

Thus, because an application capable of managing a type of data depends on the type of data, it is necessary that a user manually provides an interface between applications. This represents that a lot of labor is required for the user and deteriorates productivity. Moreover, an error easily occurs because many hands are used.

Moreover, when preparing a purposed document by using an integrated application, it is possible to arrange various data values in the form of data without printing out the data. Therefore, labor is not required compared to the case of preparing a purposed document by combining printed matters. However, applications for editing and preparing various data values are restricted to those included in an integrated application and therefore, an application desired by a user cannot be always used. Moreover, a purposed document prepared by an integrated application is one document file and edition and outputting are managed for every file. Therefore, to set a format to a part of a document file, there are many restrictions due to functions of applications and operations for setting a format every portion where formats are changed and performing reprinting are necessary. Therefore, a lot of labor is required and the productivity is deteriorated the same as the case of the above method.

Furthermore, in the case of the above prior art, a problem occurs that when functions of a plurality of printers are different from each other between the printers designated as printers for performing decentralized printing or substitute printing, it is impossible to simultaneously communicate designations set in a printing designation document to a plurality of printers as common data.

Usually, a user designates printing setting through the printer driver UI of a printer to be used for printing, the designation is input to the printer driver of DEVMODE serving as a data structure provided by an OS through the OS, the printing setting information native in the printer driver is written in the DEVMODE, the setting of the DEVMODE is read in the printer driver under printing, and print data is generated. In this case, the DEVMODE is a data structure provided by the OS, in which an already specified standard portion and an extended portion that can be freely used by each printer vendor are present as described later. Therefore, a portion that can be used by the structure of the DEVMODE is the standard portion through which it is possible to know the configuration of the structure of the DEVMODE.

However, there is a problem that the content of printing setting set in the extended portion which can be comparatively freely described but through which the configuration of the DEVMODE cannot be known unless the specification is separately obtained can be understood by only the printer driver written in the DEVMODE which internally knows the specification of the extended portion or cannot be understood by an integrated application for performing decentralized printing.

SUMMARY OF THE INVENTION

The present invention is made in view of the above conventional example and its object is to provide a printing control apparatus and a printing control method capable of managing the printing setting to a plurality of printer drivers.

It is another object of the present invention to provide a printing control apparatus and a printing control method capable of generating the printing setting information (DEVMODE) native in a printer in accordance with common general designation information included in a printing designation document and executing the processing of a printing document in accordance with the information even if printing cannot be executed by only the common setting included in the printing designation document.

It is still another object of the present invention to provide a printing control apparatus and a printing control method capable of preparing and editing a document obtained by integrating data values generated by an application program desired by a user and improving the operability of the document and the productivity of document edition.

To solve at least one of the above problems and achieve the objects, a printing control apparatus and a printing control method of the present invention are mainly provided with the following configuration.

That is, a printing control apparatus for making a printer print printing data by transmitting the data to the printer comprises input unit adapted to input a printing document and a printing designation information for specifying the processing content of the printing document;

obtainment unit adapted to specify a printer for processing the printing document in accordance with the input printing designation document and obtaining the native printing setting information which can be set to a control program in the printing control apparatus for controlling the specified printer; and transmission control unit adapted to control the processing of transmitting a printing designation according to native printing setting information obtained by the obtainment unit to the printer through the printing control program.

Preferably, the above printing control apparatus further comprises identification unit adapted to identify whether the printing setting information native in the specified printer is included in the printing designation information; and generation unit adapted to generate native printing setting information in accordance with general designation information included in the printing designation information when the native printing setting information is not included in the printing designation information, depending on an identification result by the identification unit;

wherein the specified printer is controlled in accordance with the native printing setting information generated by the generation unit.

Preferably, in the above printing control apparatus, when native printing setting information is included in the printing designation information as a result of the identification processing in the identification unit, the output unit of the printer controls the specified printer in accordance with the native printing setting information and outputs the printing document to the printer.

Preferably, in the above printing control apparatus, when the printing document is processed through substitute processing by a plurality of printers, the identification unit identifies whether the native printing setting information corresponding to a printer corresponding to a processing sequence in accordance with the substitute sequence of the printers is included in the printing designation information, and the generation unit generates the printing setting information native in a printer corresponding to the processing sequence in accordance with the general designation information when the native printing setting information is not included, depending on the identification result.

Preferably, in the above printing control apparatus, even when first native printing setting information corresponding to the printer for processing the printing document is included in the printing designation information, the generation unit generates second native printing setting information in accordance with the general designation information depending on the identification result by the identification unit and generates third native printing setting information obtained by combining the first native printing setting information and the second native printing setting information.

Preferably, in the above printing control apparatus when the printing control program is a printer driver, the obtainment unit is further provided with communication unit adapted to obtain the native setting information set in the printer driver, call the application programming interface of an operating system mounted on the printing control apparatus, and communicate the interface to the printer driver, and the generation unit directly uses the native printing setting information communicated by the communication unit.

Moreover, a printing control apparatus for transmitting printing data to a printer to make the printer distributed-print the data comprises input unit adapted to input a printing document and a printing designation information for specifying the processing content of the printing document;

obtainment unit adapted to specify a plurality of printers for processing the printing document in accordance with the input printing designation information and obtaining the specified native printing setting information when the printing document is processed in accordance with the decentralized processing by a plurality of printers; and transmission control unit adapted to control the processing for transmitting a designation instruction to the printers in accordance with the native printing setting information obtained by the obtainment unit.

Preferably, in the above printing control apparatus, the identification unit individually identifies whether the native printing setting information corresponding to each of the printers is included in the printing designation information and the generation unit generates the native printing setting information in accordance with the general designation information for a printer in which the native printing setting information is not included, depending on the identification result.

Moreover, a printing control method for making a printer print printing data by transmitting the data to the printer comprises an input step of inputting a printing document and a printing designation information for specifying the processing content of the printing document;

an obtainment step of specifying a printer for processing the printing document in accordance with the input printing designation information and obtaining the native printing setting information which can be set to a control program in the printing control apparatus for controlling the specified printer;

a transmission control step of controlling the processing of transmitting a printing designation according to native printing setting information obtained by the obtainment step to the printer through the printing control program.

Preferably, the above printing control method further comprises an identification step of identifying whether the printing setting information native in the specified printer is included in the printing designation information; and a generation step of generating native printing setting information in accordance with general designation information included in the printing designation information when the native printing setting information is not included in the printing designation information, depending on an identification result by the identification step;

wherein the specified printer is controlled in accordance with the native printing setting information generated by the generation step.

Preferably, in the above printing control method, when native printing setting information is included in the printing designation information as a result of the identification processing in the identification step, the output step controls the specified printer in accordance with the native printing setting information and outputs the printing document to the printer.

Preferably, in the above printing control method, when the printing document is processed through the substitute processing of a plurality of printers, the identification step identifies whether the native printing setting information corresponding to a printer corresponding to a processing sequence is included in the printing designation information in accordance with the substitute sequence of the printers, and the generation step generates the printing setting information native in a printer corresponding to the processing sequence in accordance with the general designation information when the native printing setting information is not included, depending on the identification result.

Preferably, in the above printing control method, even when the first native printing setting information for a printer for processing the printing document is included in the printing designation information, the generation step generates second native printing setting information in accordance with the general designation information depending on the identification result in the identification step and generates third native printing setting information by combining the first and second native printing setting information.

Preferably, in the above printing control method, when the printing control program is a printer driver, the obtainment step is further provided with a communication step of obtaining the native setting information set in the printer driver, calling the application programming interface of an operating system mounted on the printing control apparatus, and communicating the interface to the printer driver, and the generation step directly uses the native printing setting information communicated by the communication step.

Furthermore, a printing control method for transmitting printing data to a printer to make the printer distributed-print the data comprises an input step of inputting a printing document and a printing designation information for specifying the processing content of the printing document;

an obtainment step of specifying a plurality of printers for processing the printing document in accordance with the input printing designation information and obtaining the specified native printing setting information when the printing document is processed in accordance with the decentralized processing by a plurality of printers; and a transmission control step of controlling the processing for transmitting a designation instruction to the printers in accordance with the native printing setting information obtained by the obtainment step.

Preferably, in the above printing control method, the identification step individually identifies whether the native printing setting information corresponding to each of the printers is included in the printing designation information and the generation step generates the native printing setting information in accordance with the general designation information for a printer in which the native printing setting information is not included, depending on the identification result.

Furthermore, a program which can be executed by a computer for specifying functions of a printing control apparatus for making a printer print printing data as functions to be executed by the computer, capable of making the computer execute an input module for inputting a printing document and a printing designation information for specifying the processing content of the printing document;

an obtainment module for specifying a printer for processing the printing document in accordance with the input printing designation information and obtaining the native printing setting information which can be set to a control program in the printing control apparatus for controlling the specified printer; and a transmission control module for controlling the processing of transmitting a printing designation according to native printing setting information obtained by the obtainment unit to the printer through the printing control program.

Furthermore, a computer-readable recording medium storing a program module for executing a printing control method for making a printer print printing data stores an input module for inputting a printing document and a printing designation information for specifying the processing content of the printing document;

an obtainment module for specifying a printer for processing the printing document in accordance with the input printing designation information and obtaining the native printing setting information which can be set to a control program in the printing control apparatus for controlling the specified printer; and a transmission control module for controlling the processing of transmitting a printing designation according to native printing setting information obtained by the obtainment unit to the printer through the printing control program.

Furthermore, a program which can be executed by a computer for specifying functions of a printing control apparatus for making a printer distributed-print printing data as functions to be executed by the computer, capable of making the computer execute an input module for inputting a printing document and a printing designation information for specifying the processing content of the printing document;

an obtainment module for specifying a plurality of printers for processing the printing document in accordance with the input printing designation information and obtaining the specified native printing setting information when the printing document is processed in accordance with the decentralized processing by a plurality of printers; and a transmission control module for controlling the processing for transmitting a designation instruction to the printers in accordance with the native printing setting information obtained by the obtainment step.

Furthermore, a computer-readable recording medium storing a program module for executing a printing control method for making a printer distributed-print printing data stores an input module for inputting a printing document and a printing designation information for specifying the processing content of the printing document;

an obtainment module for specifying a plurality of printers for processing the printing document in accordance with the input printing designation information and obtaining the specified native printing setting information when the printing document is processed in accordance with the decentralized processing by a plurality of printers; and a transmission control module for controlling the processing for transmitting a designation instruction to the printers in accordance with the native printing setting information obtained by the obtainment step.

Furthermore, a printing control apparatus for controlling printing of document information comprises setting unit adapted to set decentralized printing for printing document information by using a plurality of printers; and document management unit adapted to store the printing setting for each printer in the document file of the document information when decentralized printing is set by the setting unit.

Preferably, in the above printing control apparatus, the document management unit stores the data structure of the printing setting specified by an OS as printing setting.

Preferably, the above printing control apparatus further comprises setting notification unit adapted to obtain printing setting stored in the document file when printing the document information and notifying a plurality of printer drivers of printing setting.

Furthermore, a printing control method for controlling printing of document information comprises a setting step of setting the decentralized printing for printing document information by using a plurality of printers; and a document management step of storing the printing setting for each printer in the document file of the document information when decentralized printing is set in the setting step.

Preferably, in the above printing control method, the document management step stores the data structure of the printing setting specified by an OS as printing setting.

Preferably, the above printing control method further comprises a setting notification step of obtaining the printing setting stored in the document file when printing the document information and notifying a plurality of printer drivers of the printing setting.

Furthermore, a program which can be executed by a computer for specifying functions of a printing control apparatus for controlling printing of document information as functions to be executed by the computer, capable of making the computer execute a setting module for setting the decentralized printing for printing document information by using a plurality of printers; and a document management module for storing the printing setting for each printer in the document file of the document information when decentralized printing is set by the setting module.

Furthermore, a computer-readable recording medium storing a program module for executing a printing control method for controlling printing of document information stores a setting module for setting the decentralized printing for printing document information by using a plurality of printers; and a document management module for storing the printing setting for each printer in the document file of the document information when decentralized printing is set by the setting module.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is an illustration showing a dialog for setting a substitute printer;

FIG. 13A is an illustration showing a list of book attributes;

FIG. 13B is an illustration showing a list of book attributes;

FIG. 14 is an illustration showing a list of chapter attributes;

FIG. 15 is an illustration showing a list of page attributes;

FIG. 22 is an illustration showing a data structure provided by an OS as a standard DEVMODE.

DETAILED DESCRIPTION OF THE PREFERRED EMBODIMENTS

Preferred embodiments of the present invention will now be described in detail in accordance with the accompanying drawings.

<Outline of System>

The outline of a document processing system which is an embodiment preferable for an information processing system of the present invention will be described by referring to FIGS. 10 to 23. In the case of the document processing system, a data file generated by a general application is converted into an electronic manuscript file by an electronic manuscript writer. A bookbinding application provides a function for editing the electronic manuscript file. Details of the function will be described below.

<System Configuration and Operations>

Figure 10:
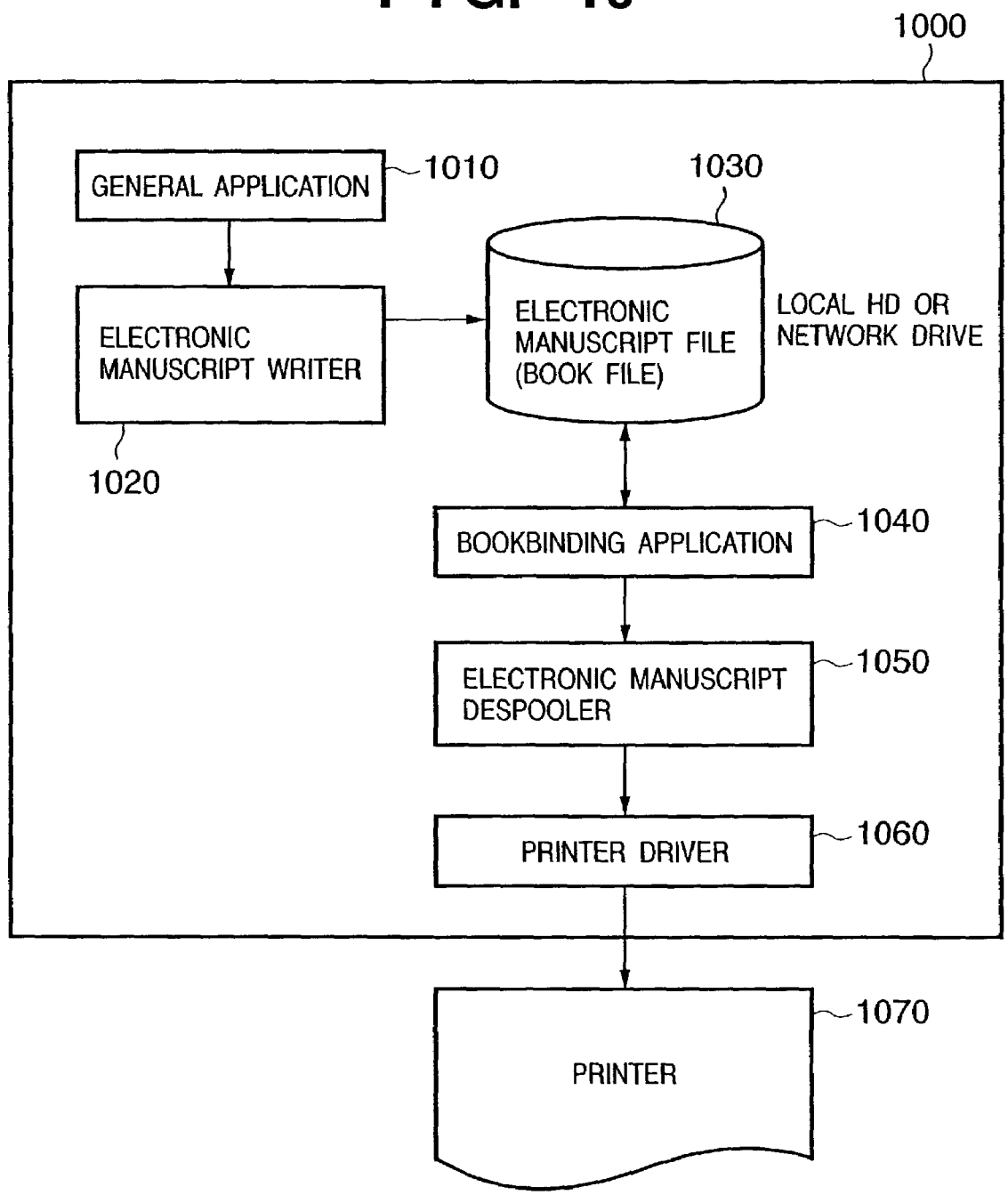
FIG. 10 is a block diagram of a stand-alone-type document processing system.

FIG. 10 is an illustration showing a software configuration of the document processing system of this embodiment. The document processing system is realized by a digital computer 1000 that is an embodiment preferable for a printing control apparatus of the present invention. A general application 1010 is an application program for providing functions such as word processing, spread sheet, photo retouch, draw, or paint, presentation, and text edition and has a printing function for an OS. These applications respectively use a predetermined interface (generally referred to as GDI) provided by an operating system (OS) in order to print application data such as generated document data or image data.

That is, the application 1010 transmits an OS-depending output command (referred to as GDI function) previously decided to an output module of an OS for providing the above interface in order to print the generated data. An output module receiving the output command converts the command into a format that can be processed by an output device such as a printer and outputs the converted command (referred to as DDI function). A format that can be processed by an output device depends on the type, manufacturer, or model of the device and therefore, a device driver is provided for each device. An OS converts a command by using the device driver, generates printing data, and thereby, a printing job is generated by binding the job with JL (Job Language). When using Windows of MicroSoft Corp. as an OS, a module referred to as GDI corresponds to the above output module.

The electronic manuscript writer 1020 is obtained by improving the above device driver and is a software module provided to realize the present document processing system. However, the electronic manuscript writer 1020 does not purpose a specific output device but it converts an output command into a format which can be processed by a bookbinding application 1040 or a printer driver 1060 to be mentioned later. The format converted by the electronic manuscript writer 1020 (hereafter referred to as electronic manuscript format) is not restricted as long as the format makes it possible to express a manuscript for each page by a detailed format. Among substantial standard formats, it is possible to use a PDF format by Adobe Systems and an SVG format as the electronic manuscript format. When making the application 1010 use the electronic manuscript writer 1020, the electronic manuscript writer 1020 is designated as a device driver used for outputting and then printing is executed.

However, an electronic manuscript file directly generated by the electronic manuscript writer 1020 is not provided with a complete format as an electronic manuscript file. Therefore, the bookbinding application 1040 designates the electronic manuscript writer 1020 as a device driver and application data is converted into an electronic manuscript file under the management by the application 1040. The bookbinding application 1040 completes a new incomplete electronic manuscript file generated by an electronic manuscript writer 1–2 as an electronic manuscript file provided with the format to be described later. Hereafter, when it is necessary to clearly identify the above point, a file generated by the electronic manuscript writer 1020 is referred to as an electronic manuscript file and an electronic manuscript file whose structure is provided by a bookbinding application is referred to as a book file. Moreover, when classification is not necessary, a document file, electronic manuscript file, and book file generated by applications are respectively referred to as a document file (or document data).

Thus, by designating the electronic manuscript writer 1020 as a device driver and printing the data by the general application 1010, application data is converted into an electronic manuscript format for each page defined by the application 1010 (hereafter referred to as logic page or manuscript page) and stored in a storage medium such as a hard disk as an electronic manuscript file 1030. It is allowed to use a local drive provided for a computer for realizing the document processing system of this embodiment as the hard disk or a drive provided for a network when the hard disk is connected to the network.

The bookbinding application 1040 reads an electronic manuscript file or the book file 1030 and provides a function for editing the file 1030 for users. However, the bookbinding application 1040 does not provide a function for editing the content of each page but it provides a function for editing a chapter or a book structure to be described later constituted by using a page as the minimum unit.

When printing the book file 1030 edited by the bookbinding application 1040, an electronic manuscript despooler 1050 is started by the bookbinding application 1040. The electronic manuscript despooler 1050 reads a designated book file from a hard disk, generates an output command adapted to the output module of the above OS in order to print each page in the format described in the book file, and outputs the command to a not-illustrated output module. In this case, the driver 1060 of a printer 1070 used as an output device is designated as a device driver. The output module converts an output command received by using the device driver 1060 of the designated printer 1070 into a device command that can be interpreted by the printer 1070. Then, the device command is transmitted to the printer 1070 and an image corresponding to the command is printed by the printer 1070.

Figure 11:
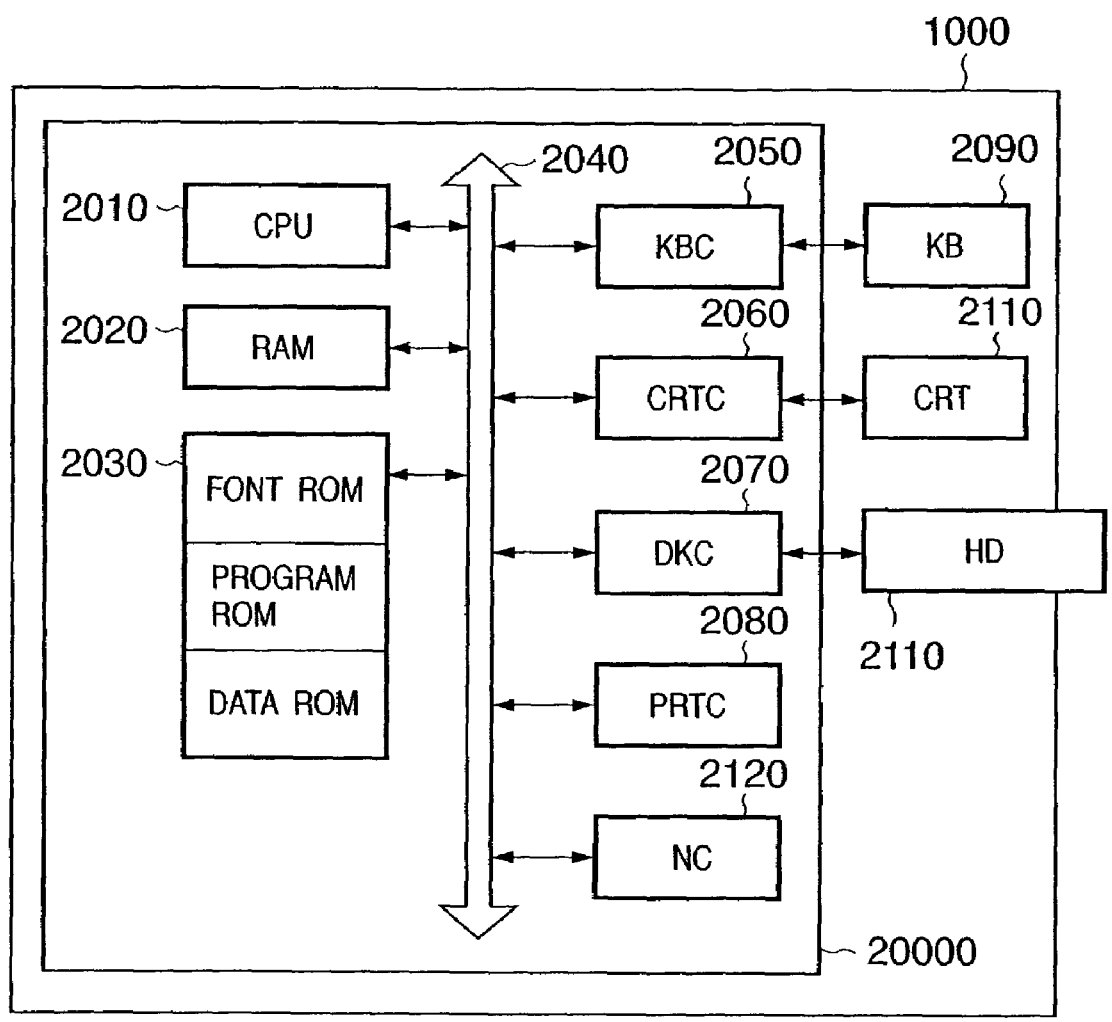
FIG. 11 is a block diagram of a computer for realizing a document processing system.

FIG. 11 is a block diagram of the hardware of the computer 1000. In FIG. 11, a CPU 2010 executes programs such as an OS, general application, and bookbinding application stored in a programming ROM of a ROM 2030 or loaded to a RAM 2020 from a hard disk 2110 to realize the software configuration in FIG. 10 and the procedure in a flowchart to be described later. The RAM 2020 functions as the main memory and work area of the CPU 2010. A keyboard controller (KBC) 2050 controls key inputs from a keyboard 2090 and a not-illustrated pointing device. A CRT controller (CRTC) 2060 controls displays of a CRT display 2100. A disk controller (DKC) 2070 controls accesses to the hard disk (HD) 2110 for storing a boot program, various applications, font data, user files, and an edition file to be described later and a floppy disk (FD). A PRTC 2080 controls exchange of signals with the connected printer 1070. An NC 2120 is connected to a network to control communications with other units connected to the network.

<Format of Electronic Manuscript Data>

The data format of a book file will be described below before referring to details of an editing application 1040. A book file has a three-layer structure obtained by simulating a book of a paper medium. The high-order layer is referred to as "book" which simulates a book and in which attributes for the whole book are defined, the middle layer under the high-order layer corresponds to a chapter of a book and is referred to as "chapter". It is possible to define an attribute for each chapter. The low-order layer is a "page" and corresponds to each page defined by an application program. It is also possible to define an attribute for each page. It is allowed that one book includes a plurality of chapters and one chapter includes a plurality of pages.

Figure 12A:
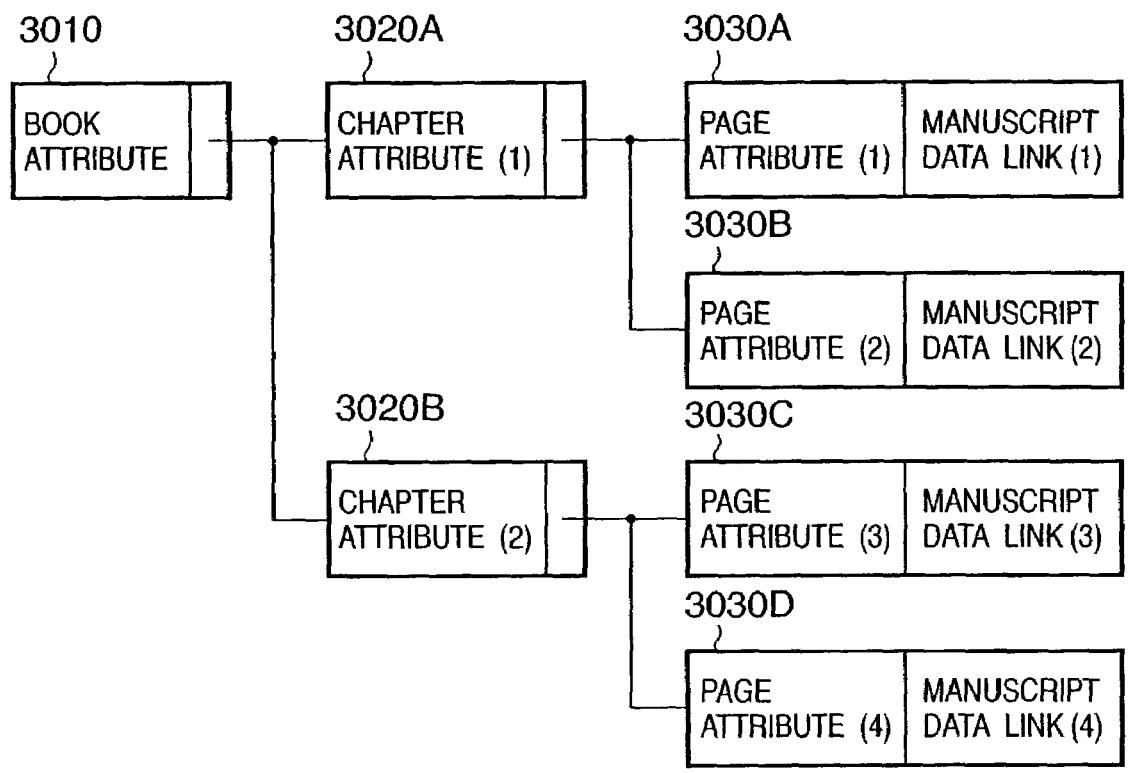
FIGS. 12A and 12B are illustrations showing a structure of a book file.
Figure 12B:
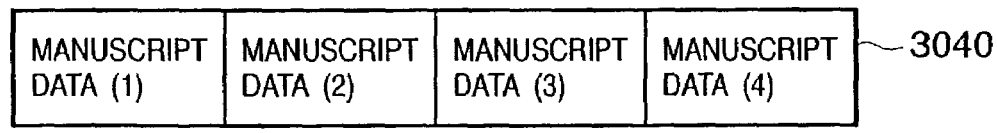

FIG. 12A is an illustration schematically showing a format of a book file. In the case of this book file, a book, chapter, and page are respectively shown by a node corresponding to each of them. One book file includes one book. Because a book and a chapter are concepts for defining the structure of a book, each concept includes a defined attribute value and a link to a low-order layer as its entity. A page has the data for each page output by an application program as an entity. Therefore, a page includes its attribute value, the entity of a manuscript page (manuscript page data), and a link to each manuscript page data value. A printing page when output to a paper medium or the like may include a plurality of manuscript pages. This structure is not displayed by a link but it is shown as the attribute in each hierarchy of a book, chapter, and page.

In FIG. 12A, a book attribute is defined in a book 3010 and two chapters 3020A and 3020B are linked. It is displayed by the link that the chapters 3020A and 3020B are included in the book 3010. It is shown in the chapter 3020A that pages 3030A and 3030B are linked and these pages are included. An attribute value is defined in each of the pages 3030A and 3030B and links to manuscript page data values (1) and (2) that are entities of the attribute values are included in the pages 3030A and 3030B. These links point out data values (1) and (2) of the manuscript page data 3040 shown in FIG. 12B and display that entities of the pages 3030A and 3030B are manuscript page data values (1) and (2).

FIGS. 13A and 13B show a list of book attributes. The attribute value of a low-order layer is preferentially used for an item that can be defined doubly with a low-order layer. Therefore, in the case of an item included only in a book attribute, a value defined in the book attribute becomes an effective value on the whole book. However, an item overlapping with a low-order layer has a meaning as a fixed value when the item is not defined in the low-order layer. Each illustrated item does not specifically correspond to one item but it includes a plurality of relevant items.

FIG. 14 shows a list of chapter attributes and FIG. 15 shows a list of page attributes. The relation between a chapter attribute and a page attribute is the same as the relation between a book attribute and a low-order-layer attribute.

Items native in a book attribute include six items such as a printing method, bookbinding details, front cover/back cover, indexpaper, plypaper, and chapterpause. These are items defined through a book. Three values of one-side printing, both-side printing, and bookbinding printing can be designated as printing-method attributes. The bookbinding printing is a method for performing printing in accordance with a format for realizing bookbinding by bundling the number of forms to be separately designated, folding them double, and binding them together. As bookbinding detailed attributes, two-page spread direction and the number of forms to be bundled can be designated when the bookbinding printing is designated.

A front-cover/back-cover attribute includes a designation of adding forms serving as a front cover and back cover and a designation of printing contents to the added forms when printing electronic manuscript files to be integrated into a book. An index-paper attribute includes a designation of inserting deckle-edged index paper separately prepared into a printer and a designation of printing contents to an index (deckle edge) portion as the pause of a chapter. The attribute becomes effective when it is provided for a printer used by an inserter having an inserting function for inserting a form prepared separately from a printing form into a desired position or when it is possible to use a plurality of form-feed cassettes. The same is applied to a plypaper attribute.

The plypaper attribute includes a designation of inserting a form supplied from an inserter or a form-feed cassette and a designation of a form-feed source when inserting plypaper as the pause of a chapter.

A chapter pause attribute includes a designation of using a new form at the pause of a chapter, a designation of using a new printing page, and a designation of doing nothing. Use of a new form and use of a new printing page have the same meaning under one-side printing. Under both-side printing, when designating "use of a new form", continuous chapters are not printed in one form. However, when designating "use of a new printing page", continuous chapters may be printed on the surface and back of one form.

A chapter attribute does not include an item native in a chapter but every chapter attribute overlaps with a book attribute. Therefore, when the definition of a chapter attribute is different from the definition of a book attribute, a value defined by the chapter attribute has priority. Items common only to a book attribute and chapter attribute include five items such as a form size, form direction, N-up printing designation, enlargement and contraction, and form discharge direction. Among these items, an N-up printing designation attribute is an item for designating the number of manuscript pages included in one printed page. Arrangements which can be designated include 1×1, 1×2, 2×2, 3×3, and 4×4. A form-discharge method attribute is an item for designating whether to apply a staple treatment to a discharged form and the validity of this attribute depends on whether a printer used has a staple function.

Items native in a page attribute include a page rotation attribute, zoom, arrangement designation, annotation, and page division. The page rotation attribute is an item for designating a rotation angle when arranging manuscript pages to printing pages. A zoom attribute is an item for designating a magnification change rate of a manuscript page. The magnification change rate is designated by assuming the size of a virtual logic page region as 100%. The virtual logic page region denotes a region occupied by one manuscript page when arranging manuscript pages in accordance with a designation such as Nup. For example, in the case of 1×1, the virtual logic page region is a region corresponding to one printing page. In the case of 1×2, the virtual logic page region becomes a region obtained by contracting each side of one printing page to approx. 70%.

A watermark attribute and header and footer attributes are attributes common to a book, chapter, and page. A watermark denotes an image or character string to be repeatedly printed on the data by an application and separately designated. A header and footer are watermarks respectively printed on the top margin and bottom margin of each page.

An item that can be designated by a variable such as a page number or date is prepared for a header and footer. Contents which can be designated in a watermark attribute and header and footer attributes are common to a chapter and page but a book is different from them. It is possible to set the contents of a watermark or a header and footer in a book and moreover, it is possible to designate how to print a watermark and a header and footer on the whole book. Moreover, in a chapter or a page it is possible to designate whether to print a watermark and a header and footer set in a book.

<Book-file Generation Procedure>

Figure 16:
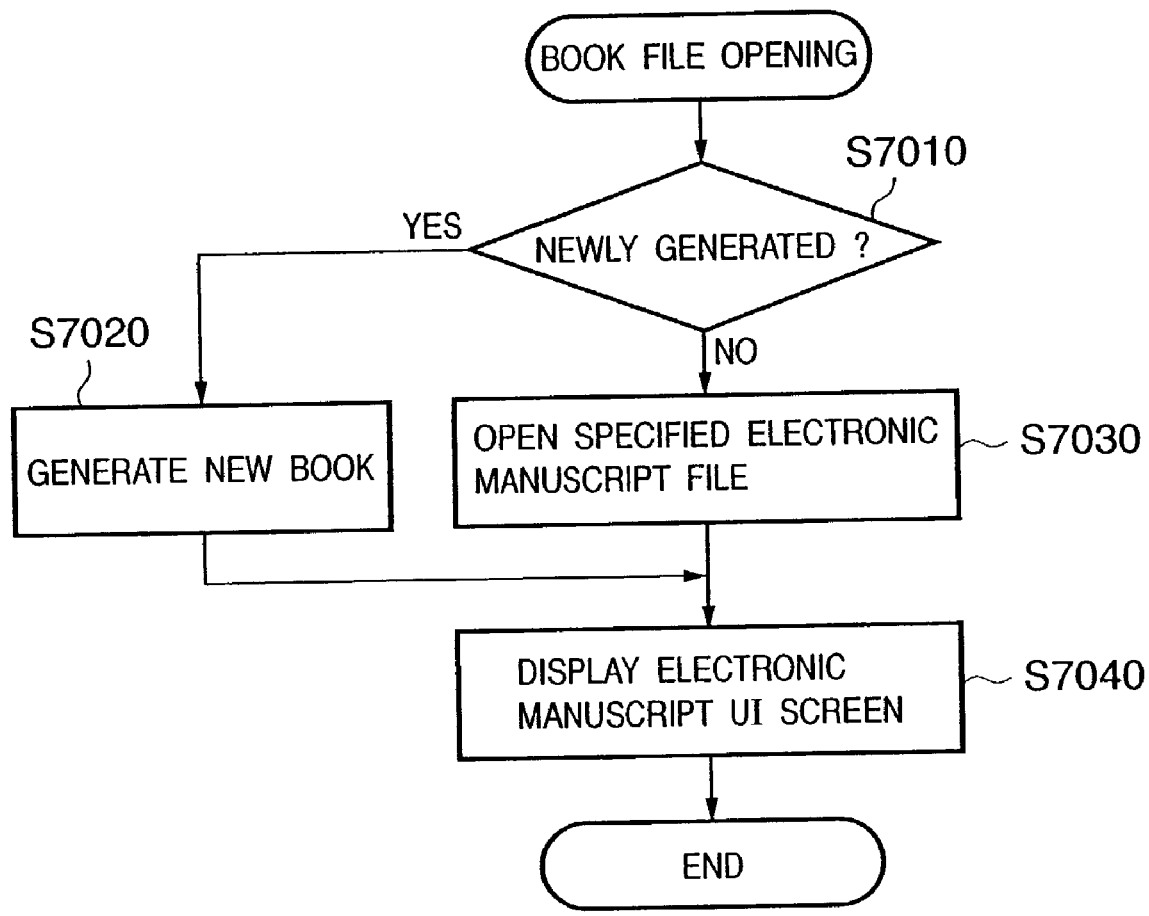
FIG. 16 is a flowchart of a procedure for opening a book file.

A book file has the above structure and contents. Then, a procedure for generating a book file by the bookbinding application 1040 and electronic manuscript writer 1020 will be described below. Generation of a book file is realized as a part of the edition of the book file by the bookbinding application 1040. FIG. 16 shows a procedure for opening a book file by the bookbinding application 1040.

Figure 20:
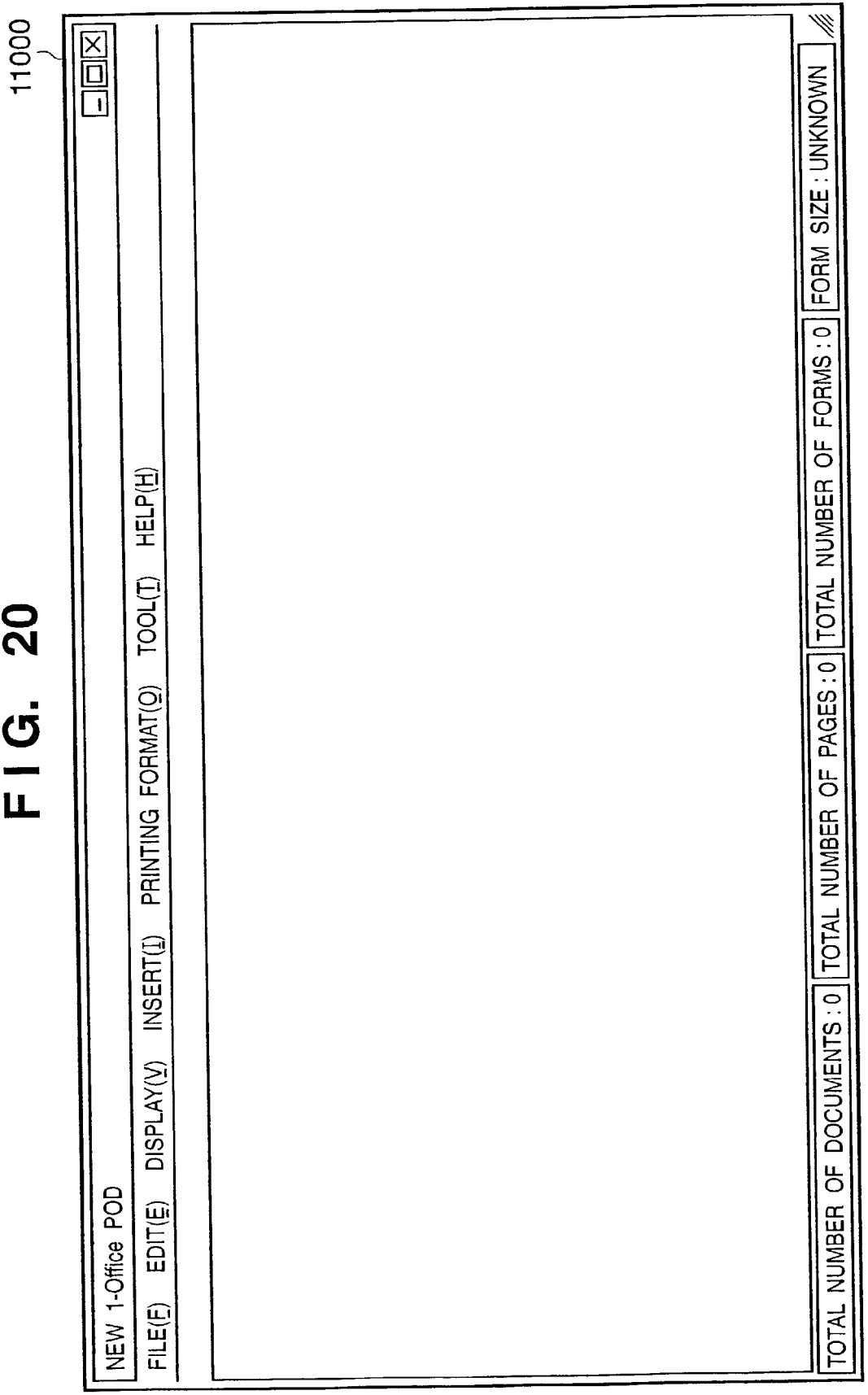
FIG. 20 is an illustration showing a user interface screen when opening a new book file.

First, the bookbinding application 1040 determines whether the book file to be opened is a book file to be newly generated or an existing book file (step S7010). When the book file is a book file to be newly generated, the bookbinding application 1040 newly generates a book file including no chapter (step S7020). As shown in FIG. 12A, the newly generated book file has only a book node 3010 which is a node of a book having no link to a node of a chapter. A set of attributes prepared for new generation is applied as a book attribute. Moreover, a user interface (UI) screen for editing the new book file is displayed (step S7040). FIG. 20 shows a UI screen when a book file is newly generated. In this case, because the book file does not have substantial contents, nothing is displayed on the UI screen 11000.

Figure 19:
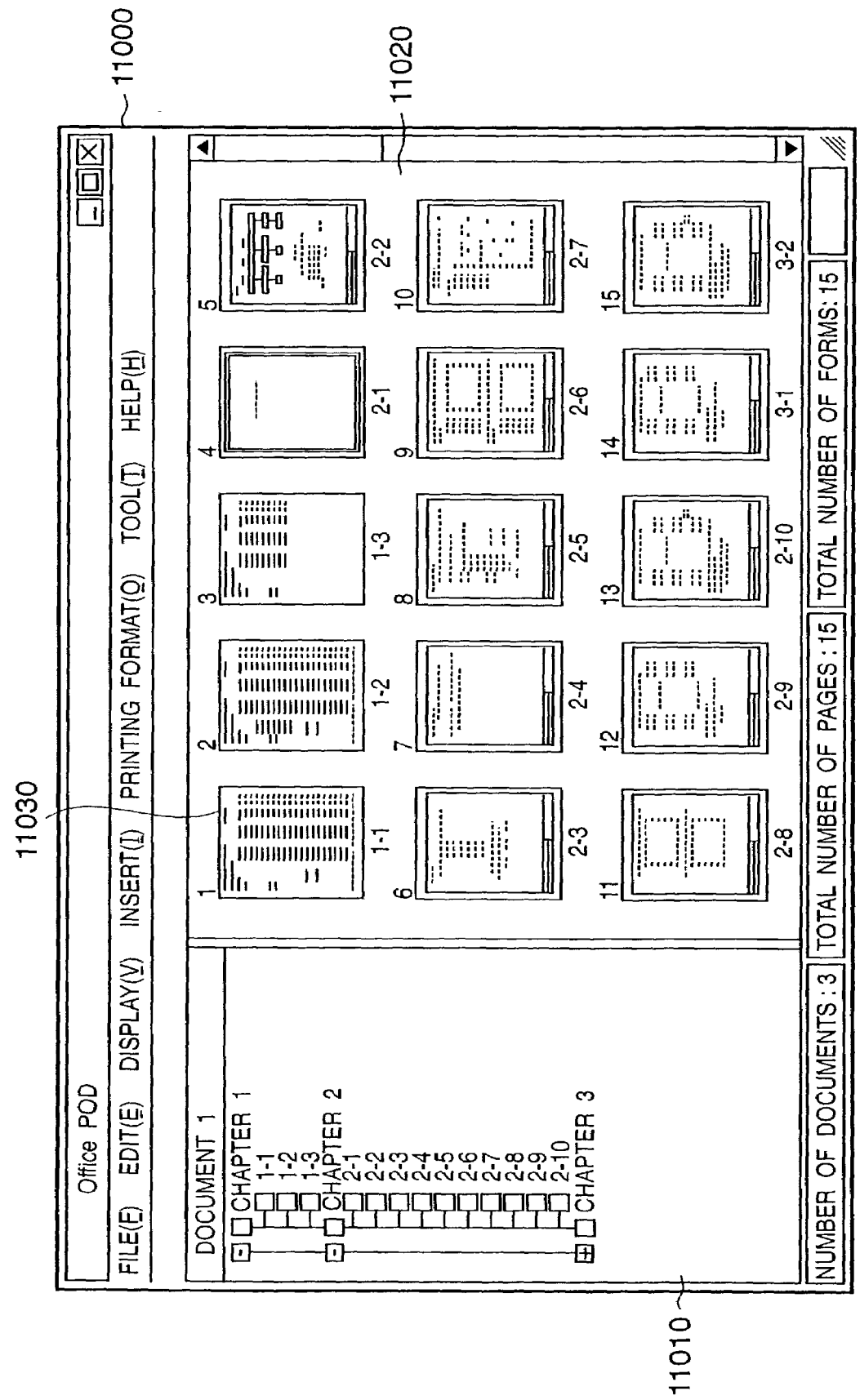
FIG. 19 is an illustration showing a user interface screen when opening an existing book file.

When an existing book file is present, the bookbinding application 1040 opens a designated book file (step S7030) and displays a user interface (UI) screen in accordance with the structure, attribute, and content of the book file. FIG. 19 shows an example of the UI screen. The UI screen 11000 includes a tree portion 11010 showing the structure of a book and a preview portion 11020 for displaying a printed state. On the tree portion 11010 are displayed chapters included in a book and pages included in each chapter in a tree structure as shown in FIG. 12A. A page displayed on the tree portion 11010 is a manuscript page. Contents of a printed page are contracted and displayed on the preview portion 11020. The display sequence reflects the structure of the book.

Figure 17:
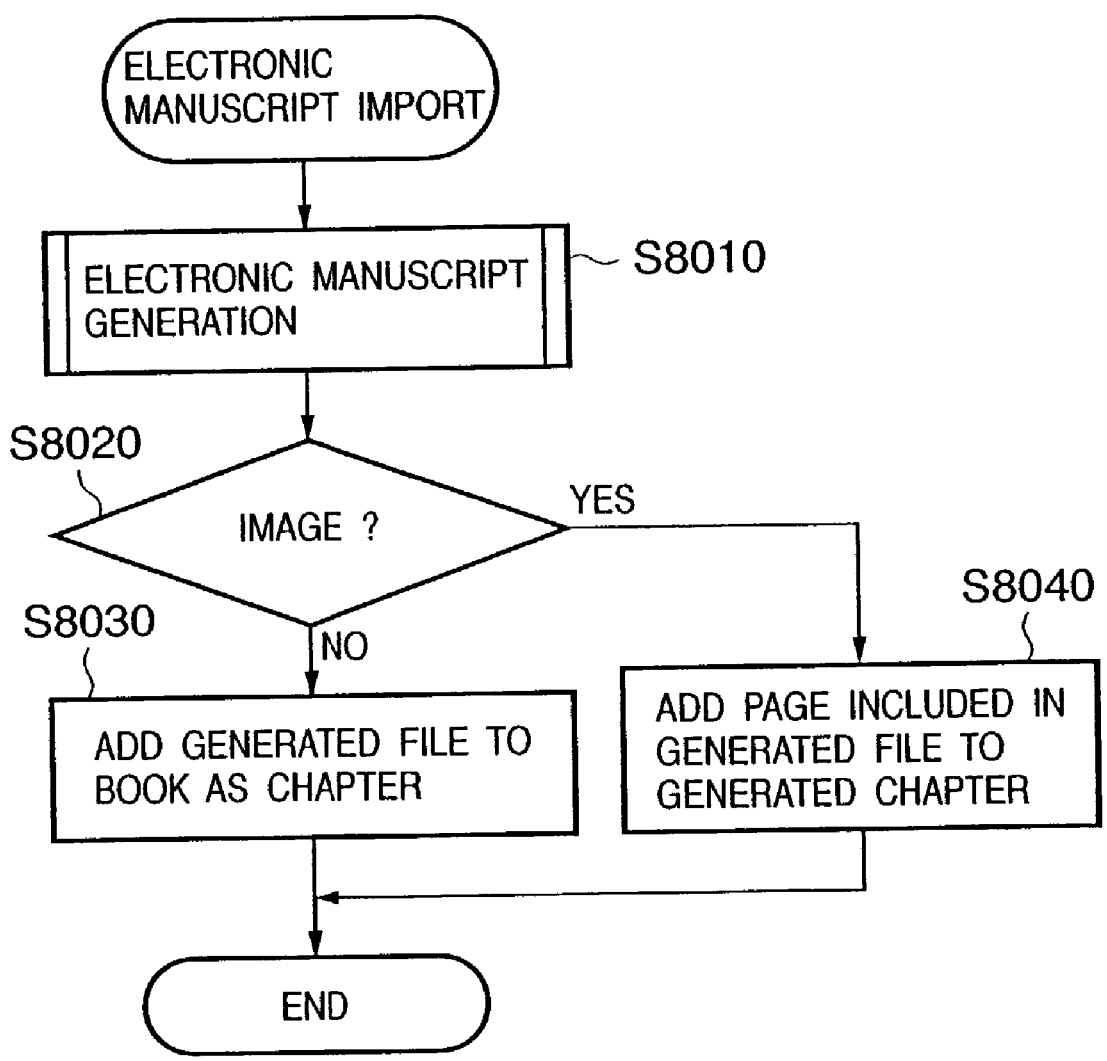
FIG. 17 is a flowchart of a procedure for importing an electronic manuscript file to a book file.

Then, it is possible to add application data converted into an electronic manuscript file by an electronic manuscript writer to the opened book file as a new chapter. This function is referred to as an electronic manuscript import function. By importing an electronic manuscript to the book file newly generated in accordance with the procedure in FIG. 16, an entity is provided for the book file. This function is started by dragging and dropping application data to the screen in FIG. 19. FIG. 17 shows a procedure for importing an electronic manuscript.

First, designated application data is converted into electronic manuscript data by starting an application program generating the application data, designating the electronic manuscript writer 1020 as a device driver, and printing out the application data (step S8010). When the conversion is completed, it is determined whether the converted data is image data (step S8020). The above determination can be performed in accordance with the file extension of application data under control by the OS of Windows. For example, it is possible to determine that the data is Windows bit map data when the extension is "bmp", the data is jpeg-compressed image data when the extension is "jpg", and the data is tiff-type image data when the extension is "tiff". Moreover, in the case of the tiff-type image data, because an electronic manuscript file can be directly generated in accordance with image data without starting an application as described in step S8010, it is possible to omit the processing in step S8010.

When the data is not image data, the bookbinding application 1040 adds the electronic manuscript file generated in step S8010 to a book of a book file currently opened as a new chapter (step S8030). The value of a book attribute is copied for an attribute common to the book attribute as a chapter attribute but a prepared specified value is set for an attribute not common to the book attribute.

When the data is image data, a new chapter is not added in principle but each manuscript page included in the electronic manuscript file generated in step S8010 is added to a designated chapter (step S8040).

However, when a book file is a newly generated file, a new chapter is generated and each page of an electronic manuscript file is added as a page included in the chapter. The attribute value of a page attribute is provided for a page attribute common to a high-order-layer attribute and the value of an electronic manuscript file defined in application data is provided for an attribute taken over to the file. For example, when Nup is designated in application data, the attribute value of Nup is taken over. Thus, a new book file is generated or a new chapter is added.

Figure 18:
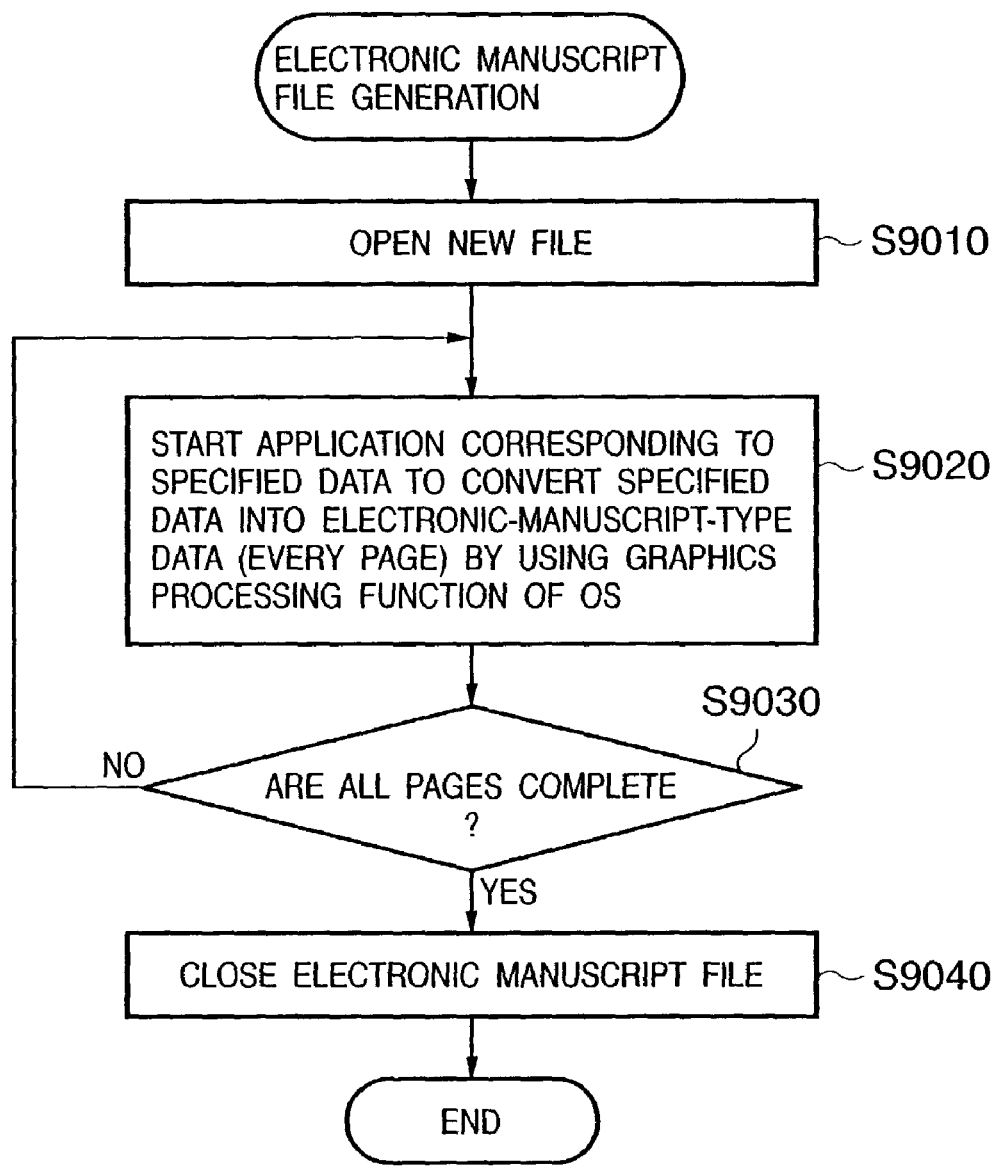
FIG. 18 is a flowchart of a procedure for converting application data into an electronic manuscript file.

FIG. 18 is a flowchart of a procedure for generating an electronic manuscript file by the electronic manuscript writer 1020 in step S8010 shown in FIG. 17. First, a new electronic manuscript file is generated and opened (step S9010). An application corresponding to designated application data is started to transmit an output command to the output module of an OS by using the electronic manuscript writer as a device driver. The output module converts the received output command into an electronic-manuscript-type data by the electronic manuscript writer and outputs the data (step S9020). The output destination is the electronic manuscript file opened in step S9010. The electronic manuscript writer 1020 determines whether conversion of every designated data is completed (step S9030) and closes the electronic manuscript file when the conversion is completed (step S9040). The electronic manuscript file generated by the electronic manuscript writer 1020 is a file including the entity of the manuscript page data shown in FIG. 12B.

<Edition of Book File>

As described above, it is possible to generate a book file in accordance with application data. For the generated book file, it is possible to edit chapters and pages as described below.
(1) Newly adding
(2) Deleting
(3) Copying
(4) Cutting
(5) Pasting
(6) Moving
(7) Change of chapter names
(8) Reassignment of page number and name
(9) Insertion of front cover
(10) Insertion of plypaper
(11) Insertion of index paper
(12) Page layout of each manuscript Moreover, it is possible to perform an operation for canceling once-performed edition and an operation for retrying a canceled operation. According to these editing functions, it is possible to perform such editing operations as integration of a plurality of book files, rearrangement of chapters or pages in a book file, deletion of a chapter or page in a book file, change of layouts of manuscript pages, and insertion of plypaper or index paper. By performing these operations, a search result is reflected on the attributes shown in FIGS. 13 to 18 or on the structure of a book file. For example, by performing a new-blank-page adding operation, a blank page is inserted into a designated portion. The blank page is handled as a manuscript page. Moreover, by changing layouts of the manuscript page, the change content is reflected on such attributes as a printing method, N-up printing, front cover or back cover, index paper, plypaper, and chapter pause.

<Output of Book File>

As described above, a book file to be generated and edited has printout as a final purpose. When a user selects the file menu from the UI screen 11000 of the bookbinding application shown in FIG. 19 and selects printing from the menu, printing out is performed by a designated output device. In this case, the bookbinding application 1040 first generates a job ticket in accordance with a currently opened book file and supplies the job ticket to an electronic manuscript despooler 1050. The electronic manuscript despooler 1050 converts the job ticket into an output command of an OS such as the GDI command of Windows and transmits the GDI command to an output module such as a GDI. The output module generates a command suitable for a device by a designated printer driver 1060 and transmits the command to the device.

A job ticket is data having a structure using a manuscript page as the minimum unit. The structure of the job ticket defines the layout of a manuscript page on a form. One job ticket is issued to each job. Therefore, a node referred to as document is present at the highest order, in which the attribute of the whole document such as both-side printing or one-side printing is defined. A form node is included below the node "document", in which attributes of an identifier of a form to be used and a designation of a form-feed port of a printer are included. The node of a sheet to be printed on each form belongs to each form node. One sheet corresponds to one form. A printing page (physical page) belongs to each sheet. One physical page belongs to one sheet in the case of one-side printing and two physical pages belong to one sheet in the case of both-side printing. A manuscript page set on each physical page belongs to each physical page. Moreover, the layout of manuscript pages is included as the attribute of a physical page.

The electronic manuscript despooler 1050 converts the above job ticket into an output command to an output module.

<Other System Configurations>

The outline of the document processing system of this embodiment is described above. Though the system is a stand-alone-type system, a book file is generated and edited in accordance with almost the same configuration and procedure also in the case of a server client system obtained by extending the stand-alone-type system. However, book files and printing are managed by a server.

Figure 21:
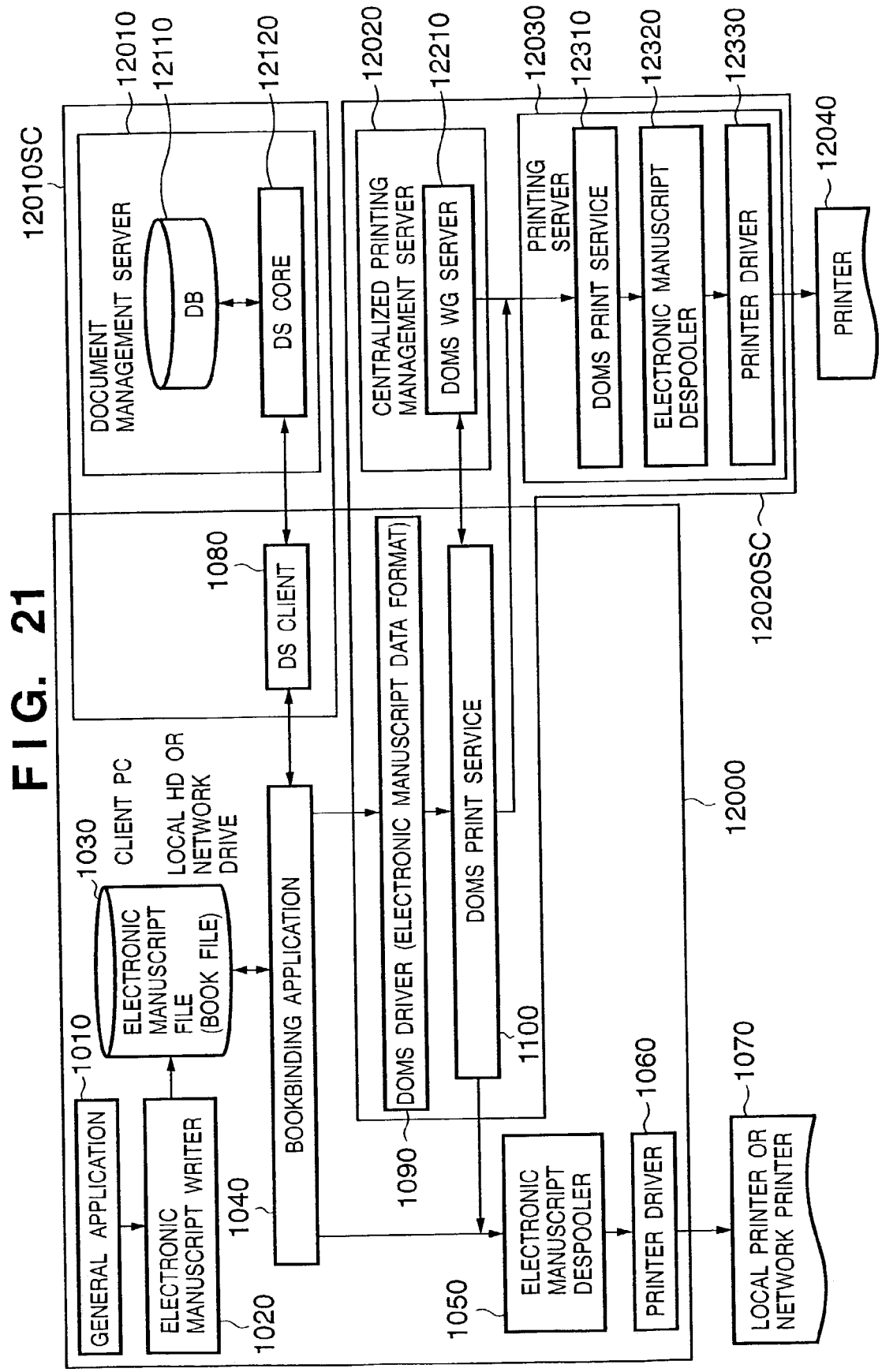
FIG. 21 is a block diagram of a client-server-type document processing system.

FIG. 21 is a block diagram showing a configuration of a server-client-type document processing system. A client document processing system has a configuration obtained by adding a DOMS (Document Output Management Service) driver 1090 serving as a client module, a DOMS print service module 1100, and a DS (Document Service) client module 1080 to a stand-alone-type system. The client document processing system 12000 connects with a document management server 12010, centralized printing management server 12020, and print server 12030. These servers are generally connected with a client document processing system by a network. However, when the servers also function as clients at the same time, they are connected by inter-process communication for simulating the communication between networks. In FIG. 21, the document management server 12010 and centralized printing management server 12020 are connected to a client. However, only either of them may be present on a network. When a connected server is a document management server, a document-management server client system 12010SC including the client module of the server is added to a stand-alone-type document management system. When a connected server is the centralized printing management server 12020, a printing-management server client system 12020SC including the client module of the server 12020 is added to the stand-alone-type document management system.

The document management server 12010 is a server for storing a book file generated and edited by the bookbinding application 1040. When managing a book file by the document management server 12010, the book file is stored in the database 12110 of the document management server 12010 instead of or in addition to the local HD of a client PC. A book file is stored and read between the bookbinding application 1040 and document management server 12010 through a DS client 1080 and DS core 12120.

The centralized printing management server 12020 is a server for managing printing of a book file stored in the client document management system 12000 or document management server 12010. A printing request by a client is transmitted to the DOMSWG server module 12210 of the centralized printing management server 12020 through the DOMS driver 1090 and DOMS print service module 1100. The centralized printing management server 12020 supplies electronic manuscript data to the electronic manuscript despooler 1050 through the DOMS print service module 1100 of a client when printing the data by the printer of the client and transmits the data to the DOMS print service module 12030 of the print server 12030 when printing the data by the print server 12030. A centralized printing management server performs security check on the qualification of a user issuing a printing request to a stored book file or stores the log of printing. Thus, a document processing system can be realized as a stand-alone or a client-server system.

<Contents of Preview Display>

As already described, when a book file is opened by a bookbinding application, the user interface screen 11000 shown in FIG. 19 is displayed. A tree showing the structure of an opened book (hereafter referred to as a watched book) is shown in the tree portion 11010. Three types of display methods are prepared in the preview portion in accordance with a designation by a user. First one is a mode referred to as a manuscript view for directly displaying a manuscript page. In the manuscript-view mode, the content of a manuscript page belonging to a watched book is contracted and displayed. A layout is not reflected on the display of the preview portion. Second one is a printing view mode. In the printing view mode, a manuscript page is displayed on the preview portion 11020 while the layout of a manuscript page is reflected on the portion 11020. Third one is a simple printing view mode. In the simple printing view mode, the content of each manuscript page is not reflected on the display of the preview portion but only a layout is reflected on it.

Embodiments related to the electronic manuscript despooler 1050 will be described below.

<First Embodiment>

<Description of Apparatus>

Embodiments of the present invention will be described in detail by referring to the accompanying drawings.

Figure 1:
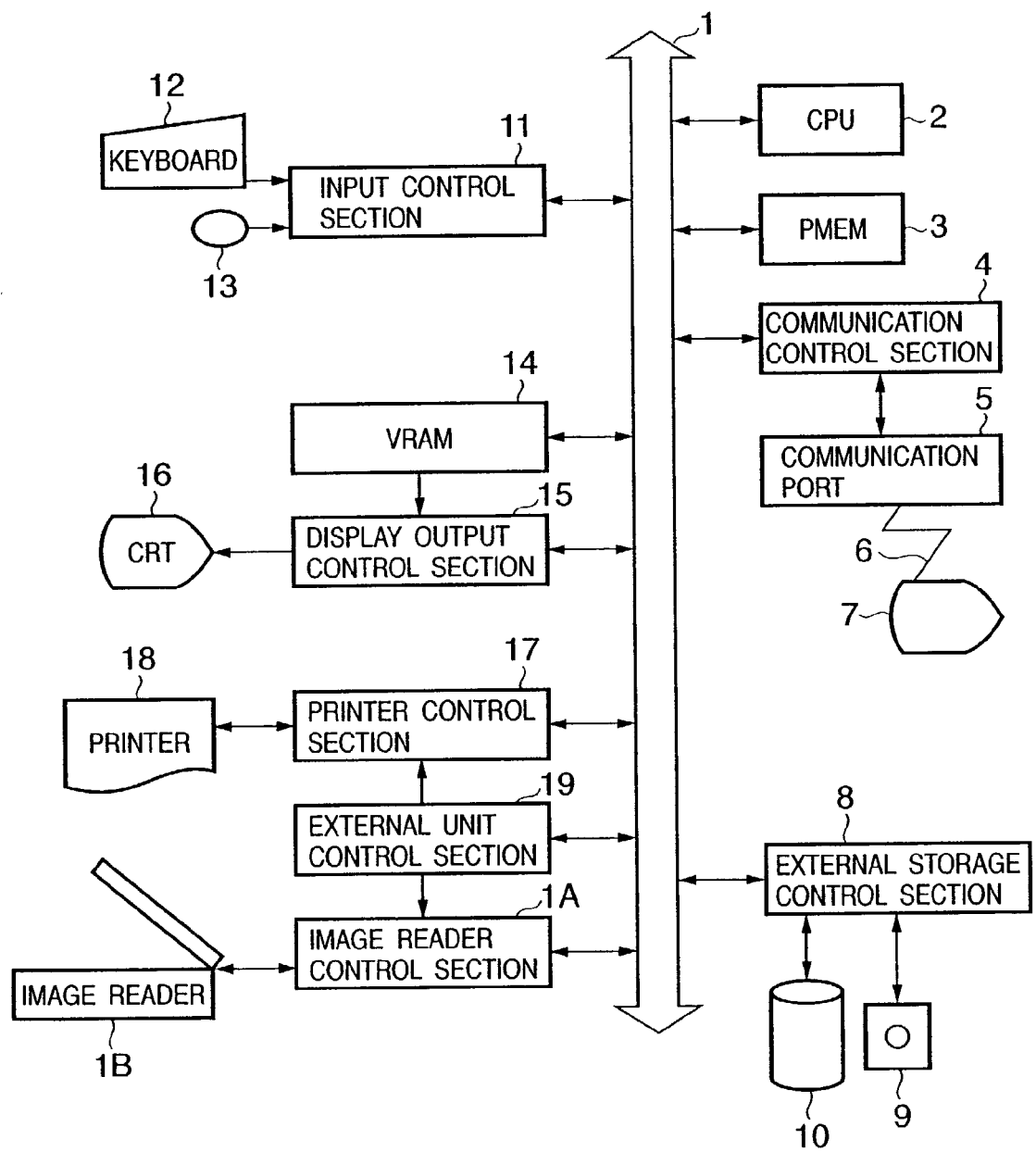
FIG. 1 is a block diagram showing a configuration of a printing control apparatus of an embodiment of the present invention and its relevant units.

FIG. 1 is a block diagram of a system constituted by the printing control apparatus (information processor) of a first embodiment and relevant units of the printing control apparatus. In FIG. 1, reference numeral 1 denotes a system bus and blocks to be described later are connected to the system bus. Reference numeral 2 denotes a CPU (Central Processing Unit). Reference numeral 3 denotes a program memory (hereafter referred to as "PMEM") which properly selects and reads a program for printing control from a hard disk 10 and thereby, the program is executed by the CPU 2.

Moreover, the data input through a keyboard 12 is stored in a PMEM also serving as a text memory as code information. Reference numeral 4 denotes a communication control section to control input/output data at a communication port 5. A signal output from the communication port 5 is transmitted to the communication port of another apparatus on a network via a communication line 6. Data transfer to and from a printer or image reader shared on the network is performed through the communication control section 4.

Furthermore, though this embodiment is described by relating to a network such as a LAN, it is needless to say that the communication port 5 connected to the communication control section 4 and a communication line 6 can be applied to this embodiment even if the communication port 5 and the communication line 6 are a general public line.

Reference numeral 8 denotes an external storage control section and reference numerals 9 and 10 respectively denote a disk for a data file. For example, reference numeral 9 denotes a floppy disk (hereafter referred to as "FD") and 10 denotes a hard disk (hereafter referred to as "HD"). Reference numeral 11 denotes an input control section that connects with input units such as the keyboard 12 and a mouse 13. An operator inputs a system operation command and the like by operating the keyboard 12.

Moreover, the mouse 13 functions as a pointing device (hereafter referred to as "PD") for processing and designating image information on a CRT 16. Thereby, it is possible to designate processing by optionally moving the cursor on the CRT 16 in X or Y direction and selecting a command icon on the command menu and moreover, designate an editing object and a drawing position. Reference numeral 14 denotes a video image memory (hereafter referred to as "VRAM"), 15 denotes a display output control section, and 16 denotes the CRT. The data displayed on the CRT 16 is expanded on the VRAM 14 as bit map data. Reference numeral 17 denotes a printer control section to control output of data to a connected printer 18. Reference numeral 1A denotes an image reader control section to control a connected image reader 1B.

In the case of embodiments of the present invention, components 1A and 1B are indispensable for an image read server unit. In the case of a client-side unit, however, it is possible to use components shared by servers through the communication control section 4 and communication port 5 as described above.

Moreover, it is assumed that the configuration in FIG. 1 has the same function even when an image reader and an image reader control section are components physically separate from each other or the image reader control section is one component including the image reader.

Furthermore, in the case of this embodiment, it is allowed that a program stored in the PMEM is also stored in a storage medium such as the hard disk (HD) 10 or floppy disk (FD) 9 directly connected to an apparatus. Furthermore, it is allowed that the program is stored in another apparatus connected to a network. Furthermore, it is possible to supply a program used for this embodiment to a system or printing control apparatus through a storage medium such as a FD or HD or a network.

Figure 2:
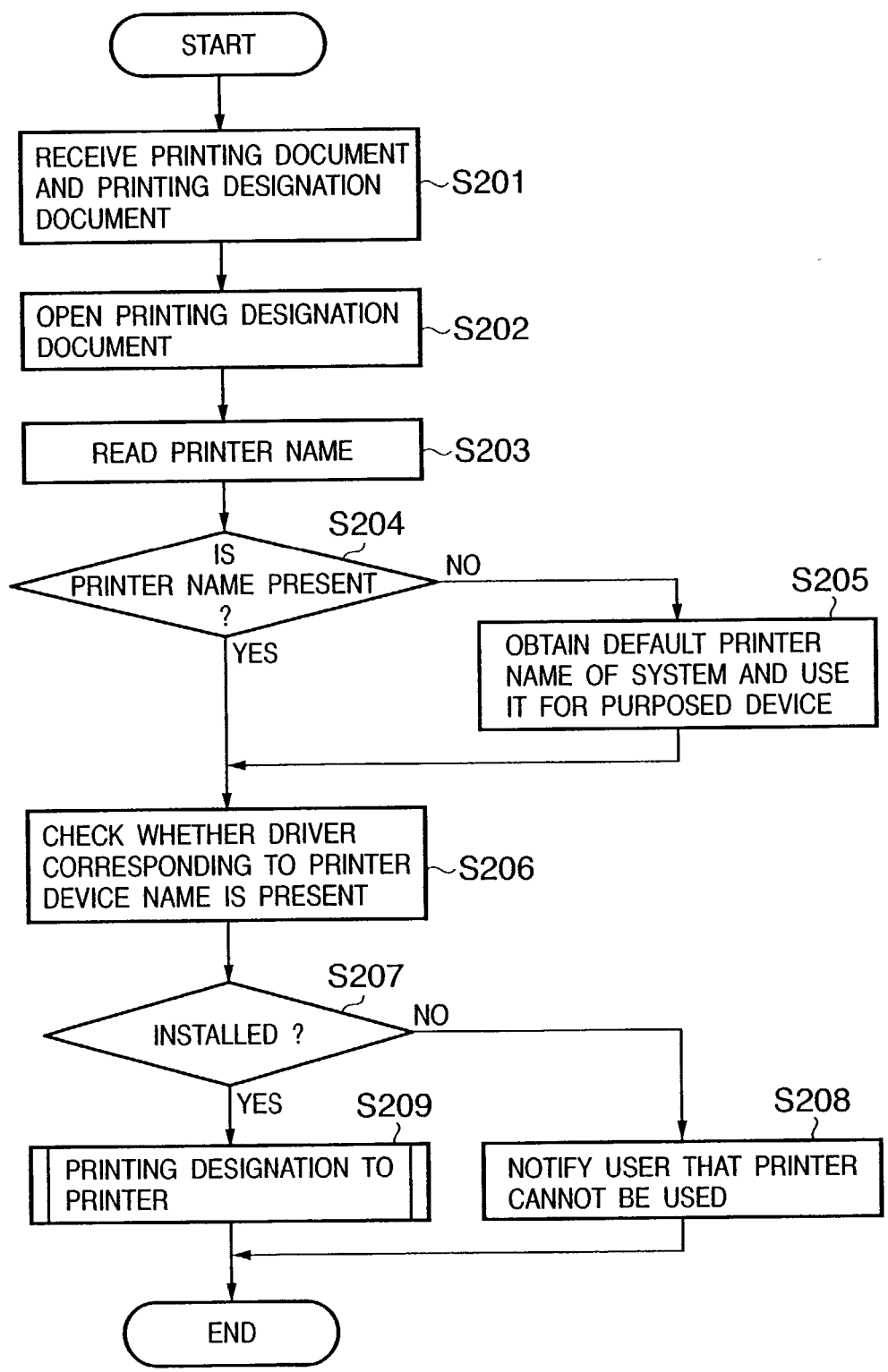
FIG. 2 is a flowchart for explaining the processing of printing control.

FIG. 2 is a flowchart for explaining the printing control by this embodiment.

First, in step S201, the printing control apparatus receives both printing document data to be printed (hereafter referred to as "printing document") and printing designation document data (hereafter referred to as "printing designation document") for output-controlling the printing document data in accordance with the user's designation. The printing designation document is the data associated with a printing document to be printed, which is the electronic document data in which the information on how to printing-control a printing document to be printed is described. A printing document and a printing designation document can be processed even when both the documents are integrated into a document file according to circumstances.

Figure 5:
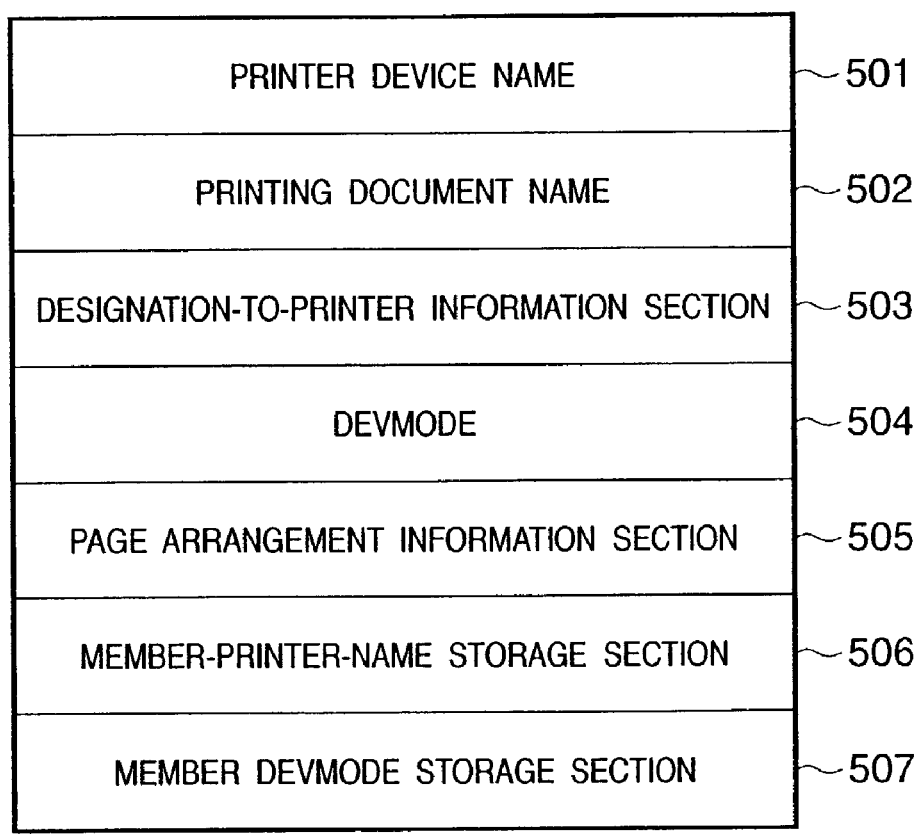
FIG. 5 is an illustration showing a data structure of a printing designation document.

The whole structure of a printing designation document is provided with a data structure having the data storage section shown in FIG. 5. The printing designation document is constituted by a designation-to-printer information section (503) for describing a printer device name (501) to be output, a printing document name (502) to be printed, and a designation to a purposed printer at an output destination, a DEVMODE storage section (504) of a printer for output, a page arrangement information section (505) for describing an arrangement and sequence by which each page of a printing document is printed, a member-printer-name-storage section (506) for storing a member printer name when decentralized printers are designated which are decentralized and connected on a network as printer devices, and a member DEVMODE storage section (507) for storing a DEVMODE corresponding to each member printer.

The DEVMODE is a device or a structure of setting information that can be set to a printer in this case. The structure has a basic portion and an extended portion. The data structure of the basic portion is opened to the public. Therefore, it is possible to convert the basic portion into a text and visually program the text. Moreover, the extended portion is a field in which each company can extend a function comparatively freely. For example, it is possible to know the content of the extended portion of the DEVMODE by analyzing a portion from which the definition of a data structure can be previously obtained such as a portion developed by the company of its own in the extended portion by a data structure tool. However, it is impossible to understand and set the content of a portion from which a data structure cannot be previously obtained such as portions developed by companies other than the company that has developed the basic portion in the extended portion because the data structure is unknown. Therefore, a mechanism is requested which can use the data in a DEVMODE structure from which a data structure cannot be previously obtained. It is possible to designate the number of copies to be printed to DmCopyie when a device supports a plurality of copies.

FIG. 22 is an illustration showing a part of a data structure provided by an OS as the standard DEVMODE. The standard portion of the DEVMODE is included in a part of the specification of an OS provided by MicroSoft Corp. Members of a structure will be described below. DmDeviceName designates a device name supported by a driver. Each device and driver have character strings that are not doubled. DmSpecVersion designates a version number according to the initialing data specification serving as a criterion of a structure. DmDriverVersion designates a version number for a printer driver assigned by the developer of the printer driver. DmSize designates the size of a DEVMODE structure excluding members of DmDriverData (information native in device) in bytes.

Each company can set values of members of the structure of the standard portion in FIG. 22. However, an extended portion not illustrated in FIG. 22 is not opened to the public as an extended portion. DmDriverExtra holds the byte length of private driver data (extended DEVMODE is hereafter referred to as extended portion) following the structure. When a device driver does not use the information native in a device, 0 is set to the member. DmOrientation can designate the direction of a form. An extended portion is a preferable example of an extended region of the present invention. Either of the members HADMORIENT_PORTRAIT (portrait) and DMORIENT_LANDSCAPE (landscape) is used. The size of a form to be printed is designated to DmPaperSize. The height and width of the form correspond to members dmPaperLength and dmPaperWidth respectively. However, when these values are set, it is possible to set 0 to the members. The standard portion is described above.

Figure 23:
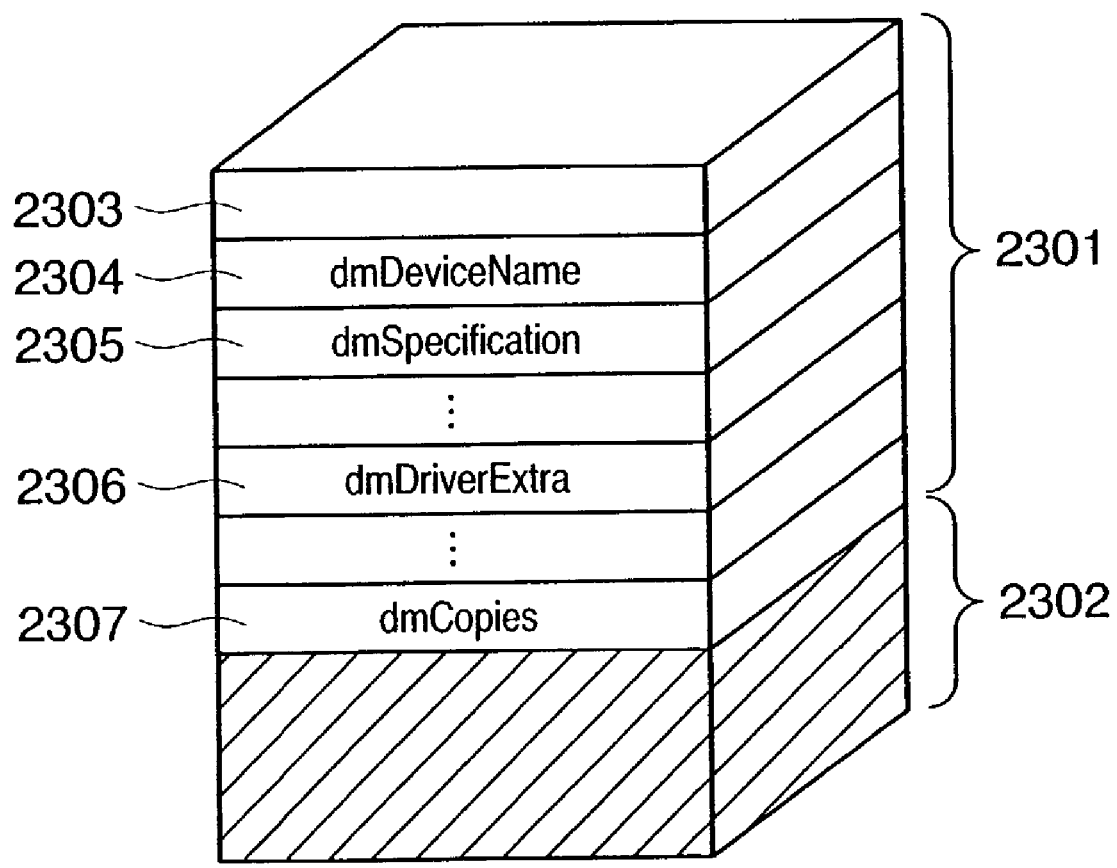
FIG. 23 is an illustration showing data structures of a standard portion and an extended portion of a DEVMODE.

FIG. 23 is an illustration showing a memory map of the standard portion 2301 and extended portion 2302 of DEVMODE that is a preferable example of a standard region. Because the data structure of the DEVMODE is previously known, it is possible to show the standard portion 2301 by the text format shown in FIG. 22 by using a development tool. For example, DmDeviceName 2304 corresponds to the same member in FIG. 22. Members 2305 to 2307 and not-illustrated other members also correspond to the same members in FIG. 22. However, the specification of the extended portion cannot be obtained in many cases. In this case, it is impossible to guess what setting is stored. FIG. 23 shows a case in which the standard portion and extended portion of DEVMODE are continuously arranged in a memory. However, there is also a case in which it is unnecessary to continuously arrange the portions. The extended portion stores N-Up, poster printing mode, presence or absence of a staple, setting information on a layout, and setting information on printing.

General designation information that is the common information for designation to a printer is stored in the designation-to-printer information section 503. For example, the general designation information includes staple position, type of punch, both-side printing or not, and designation of form-feed port. In general, the printing setting (DEVMODE) native in the printer driver of a purposed printer is generated in accordance with the general designation information and designation information is sent to the printer by using the generated DEVMODE.

When DEVMODE is already designated in the DEVMODE storage section 504, a designation is sent to a printer in accordance with designated DEVMODE independently of the description of the designation-to-printer information section 503. This assumes that because DEVMODE cannot be generated in accordance with a general printing designation in the case of a printer whose DEVMODE content is unknown, a user uses the printer by directly including a printing designation specified by the property of the printer in a printing designation document. However, it is allowed to generate new DEVMODE by reflecting the printing designation of the designation-to-printer information section 503 on the common portion with a clear structure in the DEVMODE.

Figure 6:
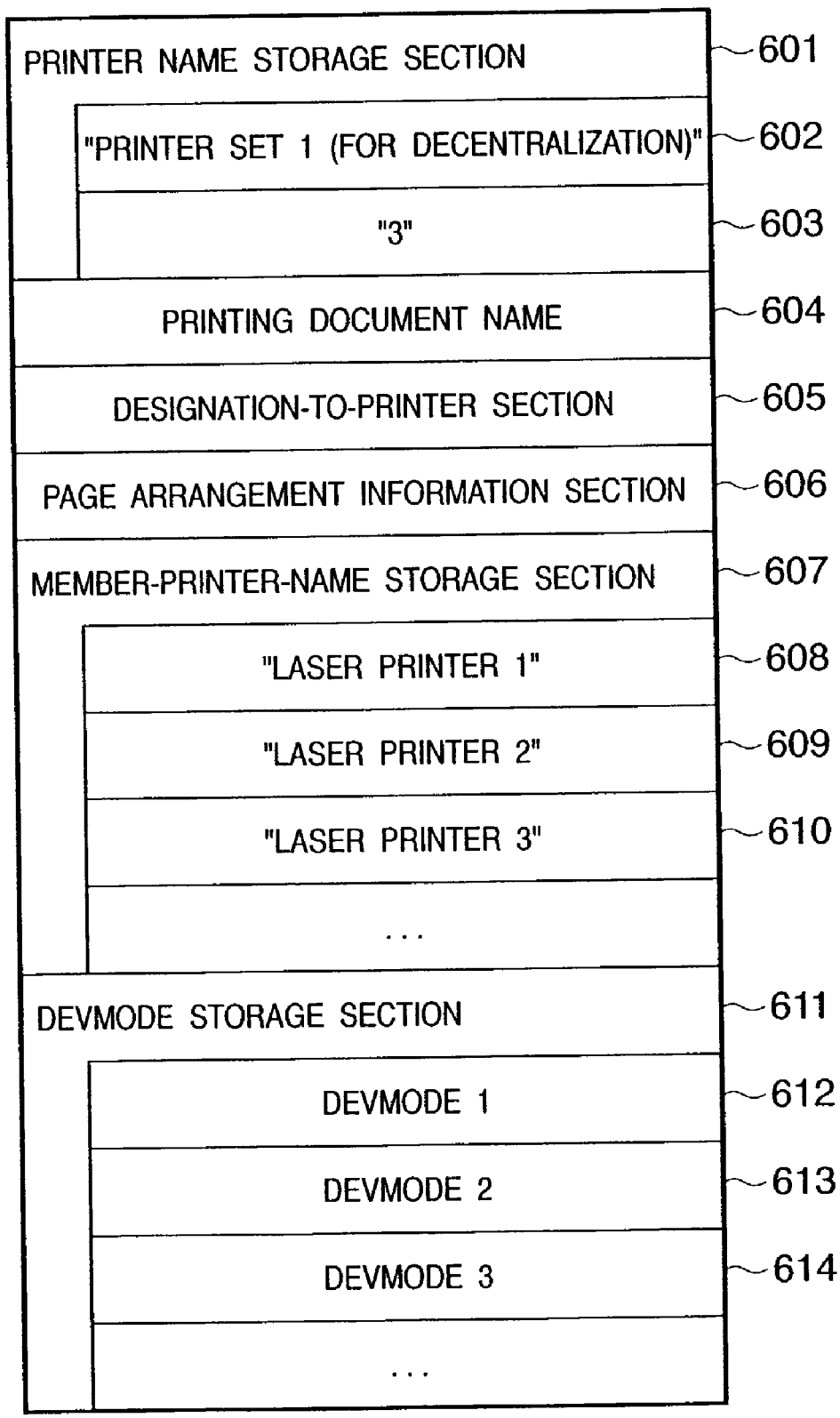
FIG. 6 is an illustration showing a data structure of a printing designation document when specifying a plurality of decentralized printers.

FIG. 6 shows the contents of a printing designation document when printers used for this embodiment are specified as a plurality of decentralized printers. Decentralized printers are specified to a printer-device-name storage section (601) in which it is described that the name is "printer set 1 (for decentralization)" (602) and objects to be decentralized are three printers (603).

In a member printer storage section (607), a plurality of printers such as "laser printer 1" (608), "laser printer 2" (609), and "laser printer 3" (610) are set as member printer names. DEVMODE1 (612), DEVMODE2 (613), and DEVMODE3 (614) are stored in a DEVMODE storage section (611) as the printing setting information native in a printer driver corresponding to each member printer.

Figure 4:
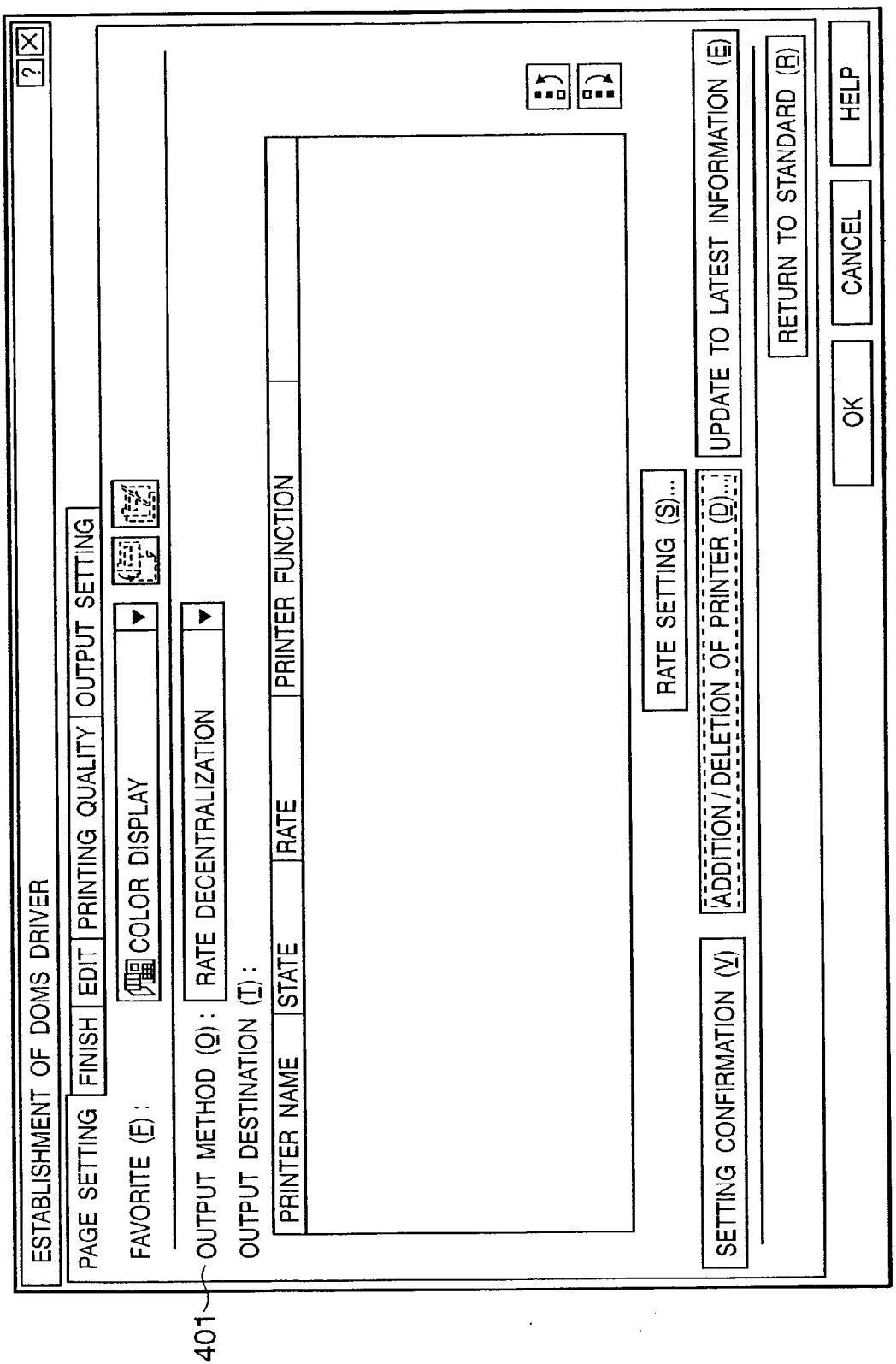
FIG. 4 is an illustration showing a dialog for setting a decentralized printer.

The user previously sets decentralized printers in accordance with the dialog screen in FIG. 4. The expression "Rate decentralization" set in accordance with the output method 401 in the dialog in FIG. 4 is a printing designation to a plurality of specified printers to make the printers execute printing with the whole printing work load being divided based on a specified rate, to allocating the loads to the printers. By using a plurality of printers as member printers and specifying these printers as a group of virtual printers, the group of these virtual printers is operated in accordance with predetermined rate decentralization. In FIG. 4, when selecting decentralized printers, DEVMODE corresponding to each printer is generated by entering the printers to be decentralized as member printers and setting a printing designation in accordance with the property of each printer and it is possible to generate the printing designation document shown in FIG. 6 in accordance with the above operation.

Specifically, when decentralized printers are set in FIG. 4 and thereafter a user specifies the decentralized printers as output destinations by a bookbinding application, a corresponding DOMS driver obtains the DEVMODE of each member printer of the decentralized printers and transmits the DEVMODE to the bookbinding application. Thereby, the bookbinding application stores the DEVMODE of the member printers delivered from the DOMS driver in the printing designation document. The processing is advanced to the next step to open the printing designation document in step S202.

Then, the printer device name specified in the printing designation document is read by DOMS print service in step S203 to check whether the printer device name is specified in the printing designation document (S204). If the printer device name is not specified (S204-none), a default printer name entered in the system is obtained and the printer device is used as an output object (S205).

Then, it is checked in accordance with the DOMS print service whether the driver corresponding to the printer device name is installed in the system (S206). If the driver is not installed (S207-No), it is communicated to the user as an error that it is impossible to use the printer (S208).

When the printer driver is installed (S207-Yes), the processing is advanced to step S209 whose details will be described later to perform printing by the printer.

Figure 3:
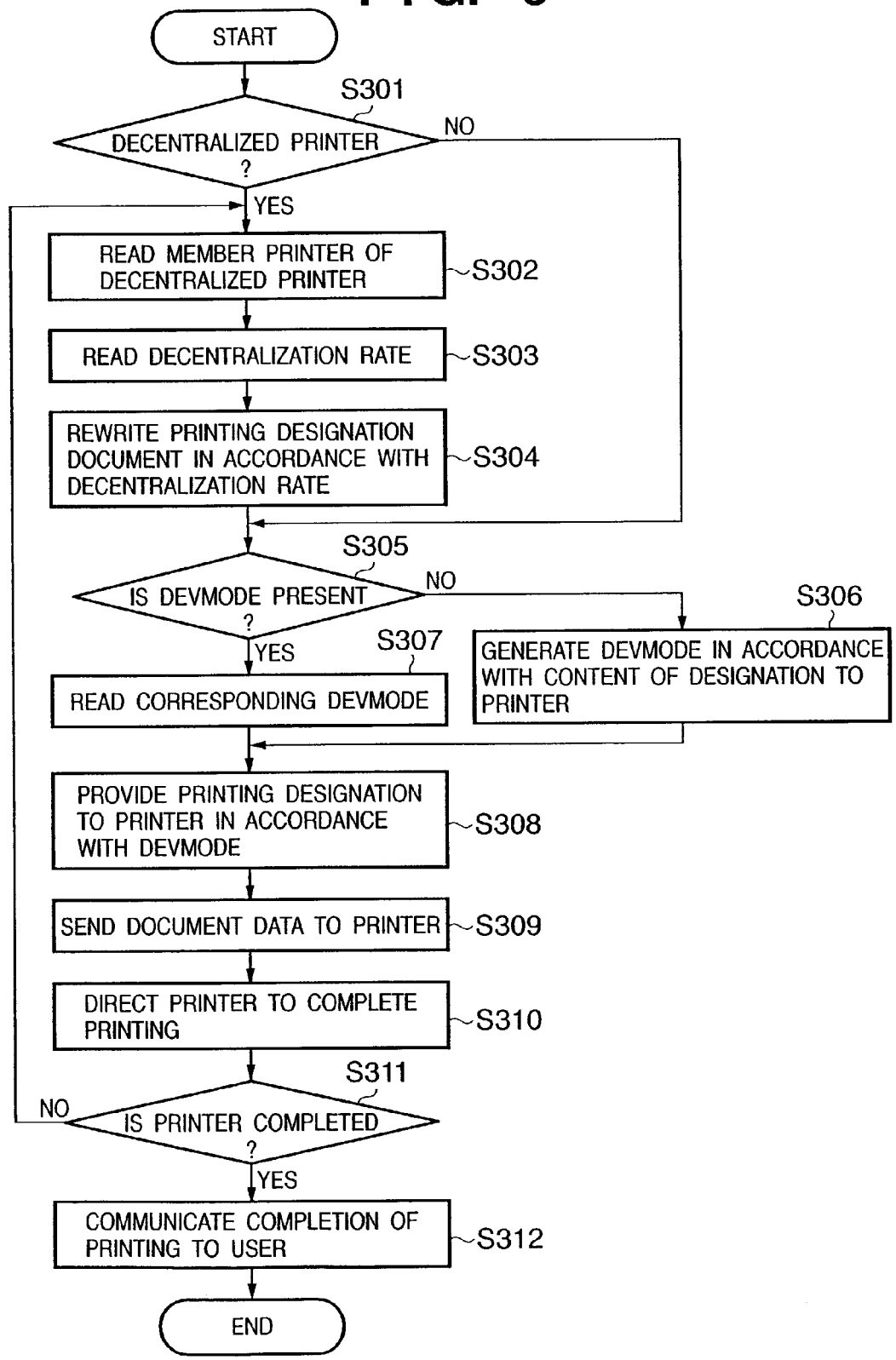
FIG. 3 is a flowchart for explaining the processing of a printing designation according to rate decentralization.

FIG. 3 is a flowchart for explaining a flow of the printing designation processing to a printer in step S209 in FIG. 2.

It is checked in accordance with DOMS print service whether a specified printer is a decentralized printer (S301). When the printer is a decentralized printer (S301-Yes), the name of a printer specified as a member printer is read as a decentralized printer (S302). Then, the decentralization rate of the output to the printer is read (S303) to rewrite the content of the printing designation document in accordance with the decentralization rate (S304).

It is checked by an electronic manuscript despooler whether the printing setting information (DEVMODE) native in a printer driver corresponding to a set printer is included in the printing designation document (S305). When the information is included in the document (S305-Yes), the information is read (S307). When the information is not included in the document (S305-No), the printing setting information (DEVMODE) native in a printer driver corresponding to a purposed printer is generated in accordance with the set content of a printing designation portion to a printer which is the content (general designation information) of the designation-to-printer information section 503 stored in the printing designation document in FIG. 5 (S306). In this case, it is allowed to generate DEVMODE set by combining printing designations of the designation-to-printer information section 503 even if DEVMODE is included depending on mounting.

Then, a designation to be communicated to the printer is sent to the printer in accordance with read or generated DEVMODE (S308). Specifically, the despooler serving as a printing module built in the DOMS system reads CreateDC( ) serving as the API of an OS by using generated DEVMODE and thereby communicates a printing designation to the printer. Then, the despooler develops the content of a printing document in accordance with the developing designation information of the data included in the printing designation document, transmits the data developed to the printer (S309), and communicates to the printer that all printing data is transmitted after the processing in step S309 (S310).

Specifically, it is possible to provide the pointer of a desired storage region to CreateDC( ) as an argument. CreateDC( ) is application programming interface which an OS provides. The despooler performs control of the OS so as to supply a pointer for pointing extended DEVMODE to CreateDC( ) as an argument, obtain the structure of DEVMODE from a desired storage region pointed by the pointer, and send the structure to a driver module. The driver obtaining the structure of DEVMODE by using CreateDC( ) transmits an instruction to a printer for printing in accordance with obtained information. The instruction issued in accordance with the content described in DEVMODE is transmitted to the printer and the printer operates in accordance with the instruction. Thereby, it is possible to effectively use even the printing setting that is set in the extended portion in which the structure of DEVMODE cannot be guessed unless separately obtaining the specification.

It is checked in accordance with DOMS print service whether member printers to be decentralized are still left (S311). When the printers are left, step S302 is restarted to continuously apply the same processing to prospective member printers from the second member printer downward. When all printings are completed, this is communicated to the user (S312) to complete printing.

As described above, according to this embodiment, even if printing cannot be performed by only the common setting included in a printing designation document, it is possible to generate the printing setting information (DEVMODE) native in a printer in accordance with the common general designation information included in the printing designation document and process a printing document in accordance with the information.

Moreover, even when processing the printing document by a plurality of decentralized printers, it is possible to generate native printing setting information for the printer requiring the information in accordance with common general designation information and execute the decentralized processing of the printing document.

<Second Embodiment>

In the case of the first embodiment, the content for controlling a plurality of printers respectively in accordance with rate decentralization is described. In the case of a second embodiment, however, contents for controlling a plurality of member printers are described for the substitute printing of making preset second or third printer execute the designation content for the first printer when the first printer designated as an output destination cannot be used or printing fails.

Figure 9:
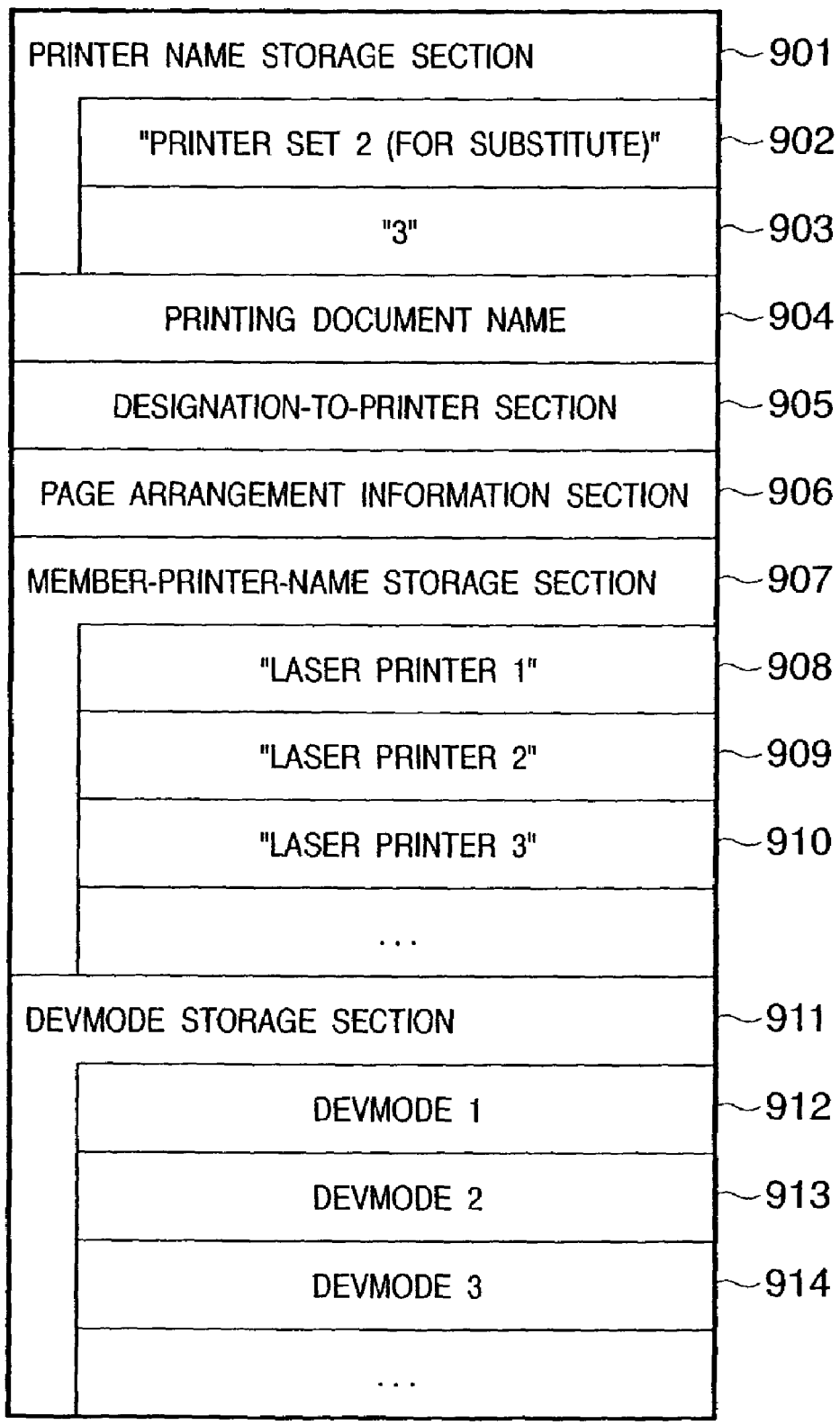
FIG. 9 is an illustration showing a data structure of a printing designation document when specifying a plurality of substitute printers.

The content of a printing designation document when a substitute printer is specified as a printer used for this embodiment has the data structure shown in FIG. 9. Substitute printers are specified in a printer-device-name storage section (901) in which it is described that the name is "printer set 2 (for substitute)" (902) and substitute objects are three printers (903).

A plurality of printers such as "laser printer 1" (908), "laser printer 2" (909), and "laser printer 3" (910) are set in a member printer storage section (907) as member printer names. DEVMODE1 (912), DEVMODE2 (913), and DEVMODE3 (914) are stored in a DEVMODE storage section (911) as the printing setting information native in a printer driver corresponding to each member printer.

Figure 8:
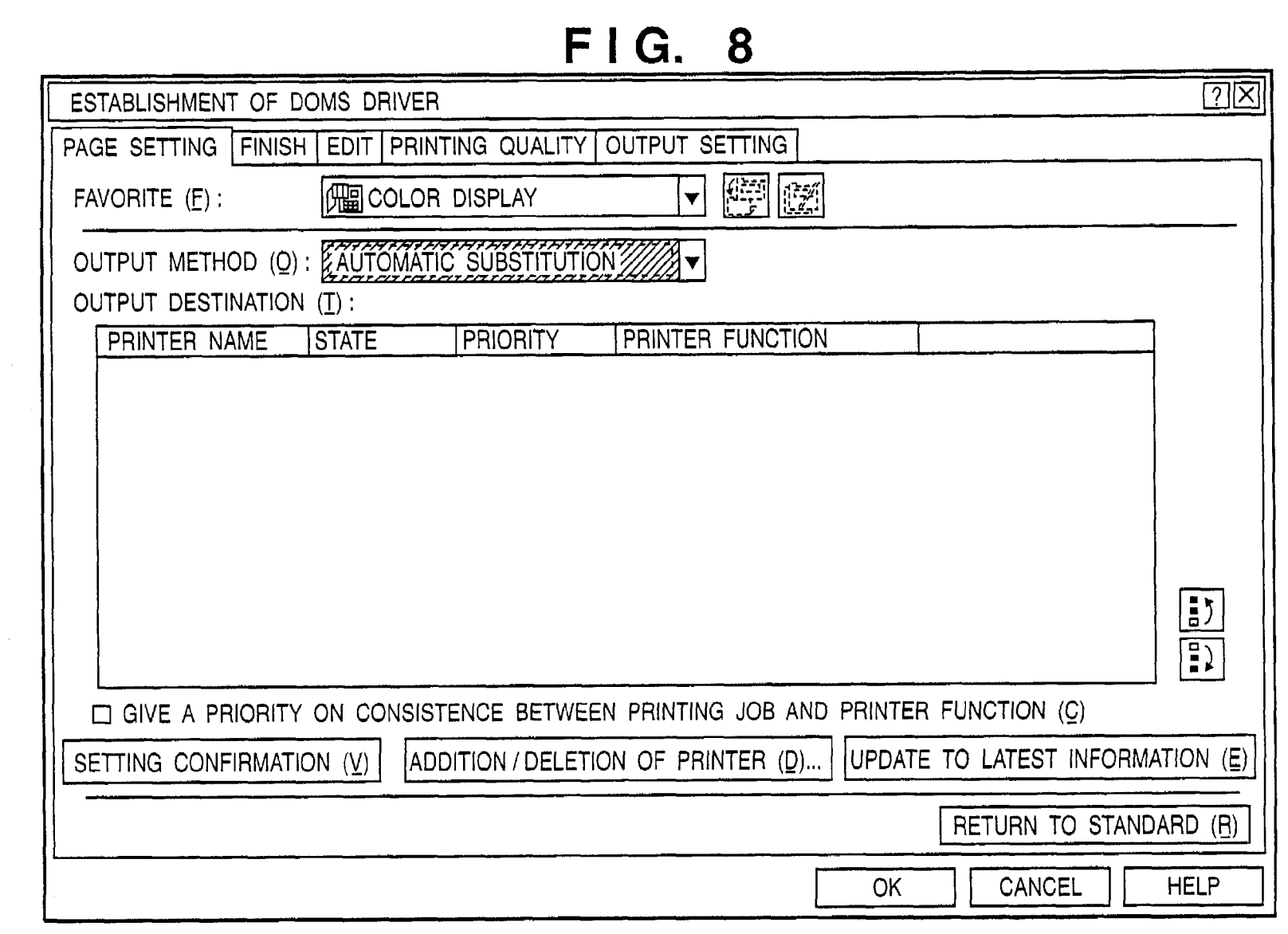

When a user previously selects a substitute printer in accordance with the dialog in FIG. 8, the user enters the substitute printer as a member printer, DEVMODE is generated by setting a printing designation in accordance with the property of each printer and it is possible to generate the printing designation document shown in FIG. 9 by operating the DEVMODE.

Specifically, when a substitute printer is set in FIG. 8 and then, a user specifies the substitute printer as an output destination in accordance with a bookbinding application, a corresponding DOMS driver obtains the DEVMODE of each member printer of the substitute printer and transmits the DEVMODE to the bookbinding application. Thereby, the bookbinding application stores the DEVMODE of the member printer supplied from the DOMS driver in the printing designation document. Substitution is executed in accordance with the sequence described in a member-printer-name storage section.

Figure 7:
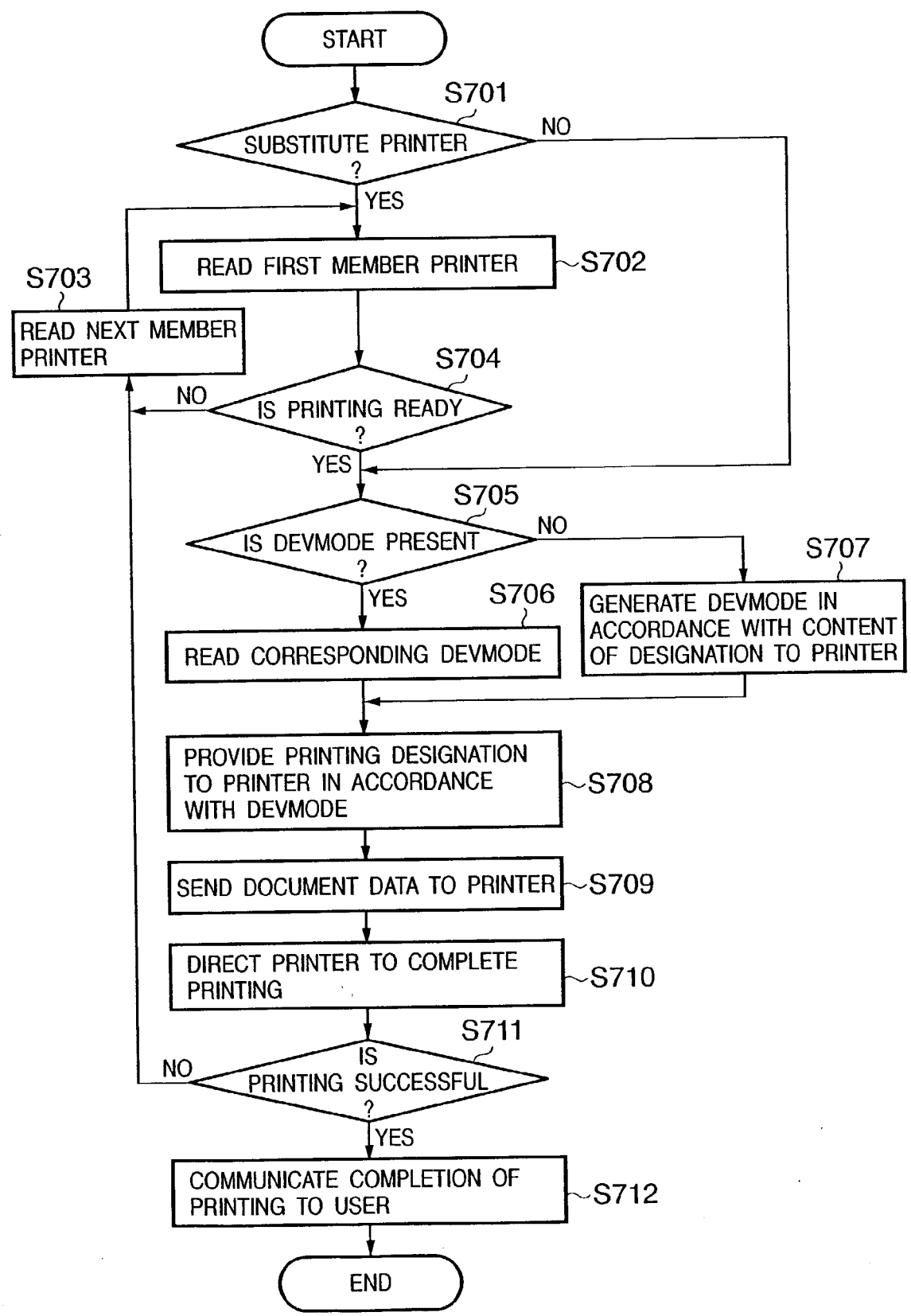
FIG. 7 is a flowchart for explaining the processing of a printing designation in accordance with substitute printing.

The processing flow in FIG. 7 shows details of the portion of a printing-designation-to-printer processing S209 shown in FIG. 2. First, it is checked in accordance with DOMS print service whether a specified printer is a substitute printer (S701). When the printer is a substitute printer, the name of a first printer specified as a member printer of the substitute printer is read (S702).

In this case, it is checked whether the first printer can be used (S704). If the first printer cannot be used (S704-No), a second member printer set in the substitute printer is read (S703) to process the printer.

An electronic manuscript despooler checks whether the DEVMODE corresponding to a set printer is included in a printing designation document (S705). When the DEVMODE is included in the document, it is read (S706). If the DEVMODE is not included, the DEVMODE of a purposed printer is generated in accordance with the content of the designation-to-printer information section 503 in FIG. 5 which is the set content of the printing-designation-to-printer portion (S707).

In this case, it is allowed to generate the DEVMODE to which the printing designation of the designation-to-printer information section 503 is repeatedly set even when DEVMODE is included depending on mounting.

Then, a designation to be communicated to a printer is sent to a printer device in accordance with the read or generated DEVMODE (S708). Specifically, the despooler serving as the printing module built in the DOMS system calls CreateDC( ) which is the API of Windows by using the generated DEVMODE and thereby communicates a printing designation to the printer. It is possible to provide a pointer of a desired storage region to CreateDC( ) as an argument, the structure of DEVMODE is obtained from the storage region pointed by the pointer and sent to a driver module.

A driver obtaining the structure of DEVMODE from CreateDC( ) transmits an instruction to a printer for printing. The instruction issued in accordance with the content described in DEVMODE is transmitted to the printer and the printer operates in accordance with the instruction. Therefore, even in the case of extended DEVMODE whose content is unknown, a pointer pointing the DEVMODE is delivered to an OS, the OS can read DEVMODE from an address pointed by the pointer and send the DEVMODE to a driver.

A printer controller for controlling the whole printer controls such options as a printer engine, sorter, and stapler in accordance with the set information shown by the DEVMODE. Then, the controller develops the content of a printing document in accordance with the data-developing-designation information included in the printing designation document, transmits the data developed to the printer (S709), and communicates that all printing data is transmitted to the printer after the processing in step S709 (S710).

In this case, it is checked in accordance with DOMS print service whether printing succeeds (S711). When printing does not succeed, the next member printer set to the substitute printer is read (S703) and processing is continued for the printer. When every printing is completed, this is communicated to the user (S712) to complete printing.

As described above, according to this embodiment, it is possible to generate native printing setting information (DEVMODE) for a printer corresponding to a substitute sequence and requiring the information in accordance with common general designation information even when processing a printing document in accordance with the substitute sequence of a plurality of printers and execute the processing according to the substitute sequence of the printing document.

That is, according to this embodiment, even if printing cannot be performed by a first printer that should perform printing, it is possible to output printing document data in accordance with the DEVMODE of second or third printer set as a member printer by substitute printing of the first printer.

<Other Embodiment>

It is allowed to apply the present invention to a system constituted by a plurality of units (such as host computer, interface units, reader, and printer) or an apparatus comprising one unit (copying machine, printer, or facsimile system).

Moreover, an object of the present invention is achieved when a system or the computer (or CPU or MPU) of an apparatus reads and executes the program code of software for realizing functions of the above-described embodiments stored in a storage medium.

In this case, the program code read from the storage medium realizes functions of the above-described embodiments and thereby, the storage medium storing the program code constitutes the present invention.

As a storage medium for supplying a program code, it is possible to use any one of a floppy disk, hard disk, optical disk, magneto-optical disk, CD-ROM, CD-R, magnetic tape, nonvolatile memory card, and ROM.

Moreover, by executing a program code read by a computer, functions of the above-described embodiments are realized and moreover, a case is included in which an OS (Operating System) working on the computer in accordance with a designation by the program code executes some or all of actual processings and functions of the embodiments are realized in accordance with the processings.

Furthermore, a case is included in which a program code read from a storage medium is written in a memory set in a function-extending board inserted into a computer or a function-extending unit connected to a computer, and then a CPU set in the function-extending board or function-extending unit performs some or all of actual processings in accordance with designation of the program code and thereby, functions of the above-described embodiments are realized.

As described above, the present invention makes it possible to generate and edit a document obtained by collecting the data generated by an application program desired by a user and improve the operability of the generation and edition of the document and the productivity of document edition.

Moreover, the present invention makes it possible to generate the printing setting information native in a printer in accordance with common general designation information included in a printing designation document and execute the processing of a printing document in accordance with the information even when printing cannot be performed by only the common setting included in a printing designation document.

Furthermore, even when decentralizing and processing a printing document by a plurality of printers, it is possible to generate native printing setting information for a printer requiring the information in accordance with common general designation information and execute decentralized processing of the printing document.

Furthermore, even when processing a printing document in accordance with the substitute sequence of a plurality of printers, it is possible to generate native printing setting information (DEVMODE) for a printer corresponding to the substitute sequence and requiring the information in accordance with common general designation information and process the printing document in accordance with the substitute sequence.

Furthermore, because various settings when generating a printing document are included in a printing designation document, it is possible to perform printing using a designation including the extended portion of DEVMODE for the printer of a company other than the above-described printer even after temporarily storing the printing designation document.

As many apparently widely different embodiments of the present invention can be made without departing from the spirit and scope thereof, it is to be understood that the invention is not limited to the specific embodiments thereof except as defined in the claims.

What is claimed is:

1. A printing control apparatus for making a printer print printing data by transmitting the data to the printer, comprising:
   an input unit adapted to input a printing document and a printing designation information for specifying the processing content of the printing document, wherein the printing designation information includes a first native portion of printing setting information and a general portion of printing setting information which are defined for each printer;
   an obtainment unit adapted to specify a printer for processing the printing document in accordance with the input printing designation information and obtain the first native portion of printing setting information which can be set to a control program in the printing control apparatus for controlling the specified printer;
   an identification unit adapted to identify whether the first native portion of printing setting information corresponding to the specified printer is obtained by said obtainment unit from the printing designation information; and
   a transmission control unit adapted to control the processing of transmitting the first native portion of printing setting information to the specified printer, in a case where the first native portion is obtained by said obtainment unit, and to control the processing of transmitting a newly generated first native portion of printing setting information used for controlling the specified printer, in a case where the first native portion is not obtained by said obtainment unit,
   wherein, even when the first native portion of printing setting information corresponding to the printer for processing the printing document is included in the printing designation information, a generation unit generates a second native portion of printing setting information in accordance with the general designation information depending on the identification result by the identification unit, and generates a third native portion of printing setting information obtained by combining the first native portion of printing setting information and the second native portion of printing setting information.

2. The printing control apparatus according to claim 1, wherein the generation unit is adapted to generate the first native portion of printing setting information in accordance with general designation information included in the printing designation information when the first native portion of printing setting information is not included in the printing designation information, depending on an identification result by the identification unit, and
   wherein the specified printer is controlled in accordance with the first native portion of printing setting information generated by the generation unit.

3. The printing control apparatus according to claim 2, wherein when the first native portion of printing setting information is included in the printing designation information as a result of the identification processing in the identification unit, the output unit of the printer controls the specified printer in accordance with the first native portion of printing setting information and outputs the printing document to the printer.

4. The printing control apparatus according to claim 2, wherein when the printing document is processed through substitute processing by a plurality of printers,
   the identification unit identifies whether the first native portion of printing setting information corresponding to a printer corresponding to a processing sequence in accordance with the substitute sequence of the printers is included in the printing designation information, and
   the generation unit generates the first native portion of printing setting information in a printer corresponding to the processing sequence in accordance with the general designation information when the first native portion of printing setting information is not included, depending on the identification result.

5. The printing control apparatus according to claim 1, wherein
   the printing control program is a printer driver,
   the obtainment unit is further provided with a communication unit adapted to obtain the first native portion of setting information set in the printer driver, call the application programming interface of an operating system mounted on the printing control apparatus, and communicate the interface to the printer driver, and
   the generation unit uses the first native portion of printing setting information communicated by the communication unit without modification.

6. A printing control apparatus for transmitting printing data to a printer to make the printer distributed-print the data, comprising:
   an input unit adapted to input a printing document and a printing designation information for specifying the processing content of the printing document, wherein the printing designation information includes a native portion of printing setting information and a general portion of printing setting information which are defined for each printer;

an obtainment unit adapted to specify a plurality of printers for processing the printing document in accordance with the input printing designation information and obtain the specified native portion of printing setting information when the printing document is processed in accordance with the decentralized processing by a plurality of printer;

an identification unit adapted to identify whether the native portion of printing setting information corresponding to the specified printers is obtained by said obtainment unit from the printing designation information; and a transmission control unit adapted to control the processing for transmitting the native portion of printing setting information to the specified printers, in a case where the native portion is obtained by said obtainment unit, and to control the processing of transmitting a newly generated native portion of printing setting information used for controlling the specified printers, in a case where the native portion is not obtained by said obtainment unit, wherein the identification unit individually identifies whether the native portion of printing setting information corresponding to each of the printers is included in the printing designation information and a generation unit generates the native portion of printing setting information in accordance with the general designation information for a printer in which the native portion of printing setting information is not included, depending on the identification result.

7. A printing control method for making a printer print printing data by transmitting the data to the printer, comprising:

an input step of inputting a printing document and a printing designation information for specifying the processing content of the printing document, wherein the printing designation information includes a first native portion of printing setting information and a general portion of printing setting information which are defined for each printer;

an obtainment step of specifying a printer for processing the printing document in accordance with the input printing designation information and obtaining the first native portion of printing setting information which can be set to a control program in the printing control apparatus for controlling the specified printer;

an identification step of identifying whether the first native portion of printing setting information corresponding to the specified printer is obtained in said obtainment step from the printing designation information; and a transmission control step of controlling the processing of transmitting the first native portion of printing setting information to the specified printer, in a case where the first native portion is obtained in said obtainment step, and to control the processing of transmitting a newly generated first native portion of printing setting information used for controlling the specified printer, in a case where the first native portion is not obtained in said obtainment step, wherein, even when the first native portion of printing setting information for a printer for processing the printing document is included in the printing designation information, a generation step generates a second native portion of printing setting information in accordance with the general designation information, depending on the identification result in the identification step, and generates a third native portion of printing setting information by combining the first and second native portions of printing setting information.

8. The printing control method according to claim 7, wherein the generation step generates the first native portion of printing setting information in accordance with general designation information included in the printing designation information when the first native portion of printing setting information is not included in the printing designation information, depending on an identification result by the identification step;

wherein the specified printer is controlled in accordance with the first native portion of printing setting information generated by the generation step.

9. The printing control method according to claim 8, wherein when the first native portion of printing setting information is included in the printing designation information as a result of the identification processing in the identification step, the output step controls the specified printer in accordance with the first native portion of printing setting information and outputs the printing document to the printer.

10. The printing control method according to claim 8, wherein when the printing document is processed through the substitute processing of a plurality of printers, the identification step identifies whether the first native portion of printing setting information corresponding to a printer corresponding to a processing sequence is included in the printing designation information in accordance with the substitute sequence of the printers, and the generation step generates the first native portion of printing setting information in a printer corresponding to the processing sequence in accordance with the general designation information when the first native portion of printing setting information is not included, depending on the identification result.

11. The printing control method according to claim 7, wherein the printing control program is a printer driver, the obtainment step is further provided with a communication step of obtaining the first native portion of setting information set in the printer driver, calling the application programming interface of an operating system mounted on the printing control apparatus, and communicating the interface to the printer driver, and the generation step uses the first native portion of printing setting information communicated by the communication step without modification.

12. A printing control method for transmitting printing data to a printer to make the printer distributed-print the data, comprising:

an input step of inputting a printing document and a printing designation information for specifying the processing content of the printing document, wherein the printing designation information includes a native portion of printing setting information and a general portion of printing setting information which are defined for each printer;

an obtainment step of specifying a plurality of printers for processing the printing document in accordance with the input printing designation information and obtaining the specified native portion of printing setting information when the printing document is processed in accordance with the decentralized processing by a plurality of printer;

an identification step of identifying whether the native portion of printing setting information corresponding to the specified printers is obtained in said obtainment step from the printing designation information; and a transmission control step of controlling the processing for transmitting the native portion of printing setting information to the specified printers, in a case where the native portion is obtained in said obtainment step, and to control the processing of transmitting a newly generated native portion of printing setting information used for controlling the specified printers, in a case where the native portion is not obtained in said obtainment step, wherein the identification step individually identifies whether the native portion of printing setting information corresponding to each of the printers is included in the printing designation information and a generation step generates the native portion of printing setting information in accordance with the general designation information for a printer in which the native portion of printing setting information is not included, depending on the identification result.

* * * * *

UNITED STATES PATENT AND TRADEMARK OFFICE
CERTIFICATE OF CORRECTION

| | | |
|---|---|---|
| PATENT NO. | : 7,161,693 B2 | Page 1 of 1 |
| APPLICATION NO. | : 10/242626 | |
| DATED | : January 9, 2007 | |
| INVENTOR(S) | : Kizaki et al. | |

It is certified that error appears in the above-identified patent and that said Letters Patent is hereby corrected as shown below:

TITLE PAGE:
Item (56) References Cited, Other Publications, after "http:" "using$_{13}$ the_generic_driver." should read -- using_the_generic_driver. --

COLUMN 2:
Line 7, "(e.g." should read -- (e.g., --.

COLUMN 12:
Line 26, "indexpaper, plypaper, and chapterpause." should read -- index paper, plypaper, and chapter pause. --.

COLUMN 27:
Line 10, "printer;" should read -- printers; --.

COLUMN 29:
Line 3, "printer;" should read -- printers; --.

Signed and Sealed this

Eighteenth Day of September, 2007

JON W. DUDAS
*Director of the United States Patent and Trademark Office*